(12) United States Patent
Osada

(10) Patent No.: US 8,503,899 B2
(45) Date of Patent: Aug. 6, 2013

(54) IMAGE FORMING APPARATUS, CONTROL METHOD, AND CONTROL PROGRAM

(75) Inventor: Mamoru Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/590,544

(22) Filed: Aug. 21, 2012

(65) Prior Publication Data

US 2012/0314257 A1 Dec. 13, 2012

Related U.S. Application Data

(60) Continuation of application No. 13/357,819, filed on Jan. 25, 2012, now Pat. No. 8,275,282, which is a continuation of application No. 12/874,671, filed on Sep. 2, 2010, now Pat. No. 8,126,349, which is a continuation of application No. 11/103,593, filed on Apr. 12, 2005, now Pat. No. 7,809,298, which is a division of application No. 10/435,078, filed on May 12, 2003, now Pat. No. 6,898,389.

(30) Foreign Application Priority Data

May 17, 2002 (JP) ................................. 2002-143081

(51) Int. Cl.
 *G03G 15/00* (2006.01)
(52) U.S. Cl.
 USPC .......................................................... 399/81
(58) Field of Classification Search
 USPC .............. 399/1, 8, 75, 81; 715/702, 781, 792, 715/810, 826
 See application file for complete search history.

(56) References Cited

U.S. PATENT DOCUMENTS

| 5,012,280 A | 4/1991 | Tsutsumi et al. |
| 5,061,958 A * | 10/1991 | Bunker et al. ................... 399/81 |

(Continued)

FOREIGN PATENT DOCUMENTS

| JP | 02-075052 A | 3/1990 |
| JP | 8-123696 A | 5/1996 |

(Continued)

OTHER PUBLICATIONS

Takeuchi & Miura, Quickly Open Programs and Files from the Taskbar, NIKKEI PC (Japan), May 1, 2002, vol. 4, No. 9, at 44, (with English Translation).

(Continued)

*Primary Examiner* — Sandra Brase
(74) *Attorney, Agent, or Firm* — Fitzpatrick, Cella, Harper & Scinto

(57) ABSTRACT

An image forming apparatus having a display unit for displaying a program which can be executed in the apparatus so as to be identified is disclosed. The apparatus has: an input unit for inputting a program into the image forming apparatus; a display control unit for controlling a process for displaying select keys including a plurality of select keys to instruct a selection of a desired one of a plurality of programs stored in the image forming apparatus onto a display screen displayed on the display unit; and a discriminating unit for discriminating whether the select key to instruct a selection of the program inputted by the input unit can be further displayed onto the first display screen to display the select keys corresponding to the programs registered in the image forming apparatus in response to the input of the program from the input unit or not.

9 Claims, 19 Drawing Sheets

U.S. PATENT DOCUMENTS

| | | | |
|---|---|---|---|
| 5,170,340 | A | 12/1992 | Prokop et al. |
| 5,391,918 | A | 2/1995 | Koyanagi et al. |
| 5,442,541 | A * | 8/1995 | Hube et al. .................... 700/9 |
| 5,497,455 | A | 3/1996 | Suga et al. |
| 5,907,319 | A | 5/1999 | Hashimoto et al. |
| 5,909,602 | A | 6/1999 | Nakai et al. |
| 5,909,684 | A * | 6/1999 | Nelson ..................... 717/118 |
| 5,969,826 | A | 10/1999 | Dash et al. |
| 5,982,367 | A | 11/1999 | Alimpich et al. |
| 5,999,740 | A * | 12/1999 | Rowley .................... 717/173 |
| 6,237,092 | B1 * | 5/2001 | Hayes, Jr. ................... 713/100 |
| 6,421,509 | B1 | 7/2002 | Nomura et al. |
| 6,478,222 | B1 | 11/2002 | Sarfati |
| 6,606,460 | B2 | 8/2003 | Konno |
| 6,741,269 | B2 | 5/2004 | Morikawa |
| 6,782,402 | B1 * | 8/2004 | Hidaka et al. .................. 355/36 |
| 6,898,389 | B2 | 5/2005 | Osada |
| 6,934,722 | B1 * | 8/2005 | Goshey et al. ............... 717/109 |
| 6,952,542 | B1 | 10/2005 | Morikawa |
| 7,134,090 | B2 * | 11/2006 | Kodosky et al. ............. 715/826 |
| 8,126,349 | B2 | 2/2012 | Osada |
| 2001/0009427 | A1 | 7/2001 | Kaneko et al. |
| 2002/0054326 | A1 | 5/2002 | Morita |

FOREIGN PATENT DOCUMENTS

| | | |
|---|---|---|
| JP | 10-091488 A | 4/1998 |
| JP | 11-194667 A | 7/1999 |
| JP | 11-212793 A | 8/1999 |
| JP | 11-327962 A | 11/1999 |
| JP | 2000-324555 A | 11/2000 |
| JP | 2001-208547 A | 8/2001 |
| JP | 2001-249814 A | 9/2001 |
| JP | 2001-265599 A | 9/2001 |
| JP | 2001-296987 A | 10/2001 |
| JP | 2002-082806 A | 3/2002 |
| JP | 2001-522075 T | 11/2011 |

OTHER PUBLICATIONS

Eiji Yamamoto, Macintosh Glossary, Ma-Pa no kototen, Monthly MacPower—Special Appendix to March Issue, Mar. 1, 1999, at p. 86.

Notification of Reasons for Refusal—Japanese Patent Appln. No. 2010-167462, Japanese Patent Office, Apr. 19, 2011.

Kei Sakaki, "Brief Description of Architecture of i-appli", in Java for 1-appli Introduction of Programming, First Edition, Yukio Miwa, Apr. 20, 2002.

Notice of Reasons for Refusal—Appln. No. JP 2010-167462, Japanese Patent Office, Jul. 12, 2011.

* cited by examiner

FIG. 11

| APPLICATION NAME | STATUS | VERSION | DATE/TIME | STORAGE DESTINATION | TYPE | UI | FRAMEWORK | API |
|---|---|---|---|---|---|---|---|---|
| MANAGEMENT | ACTIVATE | 1.0 | 2002/2/4 | /DISK1/APP/SYS/AppMng/AppMng | SYSTEM | YES | 1.0 | 1.2 |
| SIMPLE COPY | ACTIVATE | 1.13 | 2002/4/18 | /DISK1/APP/Gen/EsyCpy/EsyCpy | GENERAL | YES | 1.0 | 1.2 |
| App3 | ACTIVATE | 1.0 | 2002/4/1 | /DISK1/APP/Gen/App3/App3 | GENERAL | YES | 1.0 | 1.2 |
| SCAN | STOP | 1.10 | 2002/3/12 | /DISK1/APP/Gen/Scan/Scan | GENERAL | YES | 1.0 | 1.2 |
| App4 | ACTIVATE | 2.1 | 2002/3/14 | /DISK1/APP/Gen/App4/App4 | SYSTEM | NO | 1.0 | 1.2 |
| | | | | | | | | |

1101  1102  1103  1104  1105  1106  1107  1108  1109

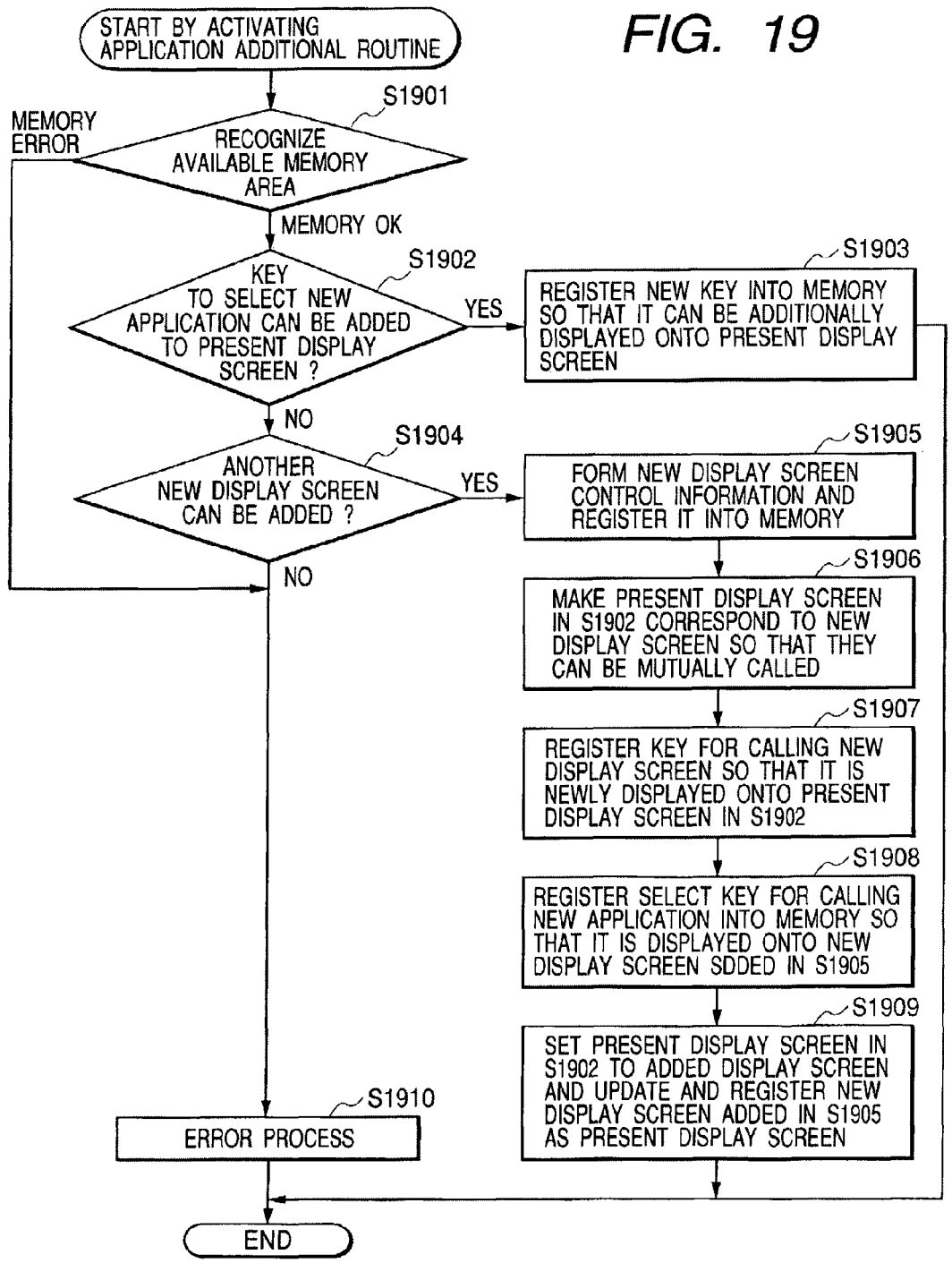

IMAGE FORMING APPARATUS, CONTROL METHOD, AND CONTROL PROGRAM

This application is a continuation application of U.S. patent application Ser. No. 13/357,819, filed Jan. 25, 2012, which is a continuation application of U.S. patent application Ser. No. 12/874,671, filed Sep. 2, 2010, which issued as U.S. Pat. No. 8,126,349 on Feb. 28, 2012, which is a continuation application of U.S. patent application Ser. No. 11/103,593, filed Apr. 12, 2005, which issued as U.S. Pat. No. 7,809,298 on Oct. 5, 2010, which is a divisional application of U.S. patent application Ser. No. 10/435,078, filed on May 12, 2003, which issued as U.S. Pat. No. 6,898,389 on May 24, 2005.

This application also claims priority to Japanese Patent Application No. 2002-143081, filed May 17, 2002, which is herein incorporated by reference in its entirety.

BACKGROUND OF THE INVENTION

1. Field of the Invention

The invention relates to an image forming apparatus having functions of a printer, a scanner, facsimile apparatus, a copying apparatus, and the like, and their hybrid apparatus. The invention also relates to a control method and a control program for such an image forming apparatus.

2. Related Background Art

Hitherto, in an image forming apparatus and control for such an image forming apparatus, it is a main stream that a system is constructed on an execution environment which is realized by a real-time OS that is different from a general OS to be implemented in a PC (personal computer), is used for an assembling system, and largely depends on an architecture.

As disclosed in JP-A-2001-249814, there has been tried a method whereby another execution environment for the assembling system, for example, an execution environment such as Java (registered trademark) or the like is further constructed on the foregoing real-time OS and an application module having high transplant performance for making simple control of a copying apparatus is downloaded from the outside and implemented although it is limitative.

There has also been tried a method whereby a design construction of an operation panel of a copying apparatus is changed by changing a program for controlling an operation display screen which is displayed onto a touch panel or the like of the copying apparatus. In the conventional image forming apparatus and control method for such an image forming apparatus, a form such that a program which is executed in one of the execution environments occupies an operation unit is used in terms of a construction.

In an operation panel or a display panel provided for the image forming apparatus such as copying apparatus, printer, or the like, an effective display area is not so wide due to problems of costs and an electric power consumption. Even if a display unit having a relatively large display area is used at the sacrifice of the costs or the like, an amount of information to be displayed in the limited display area is increasing due to the realization of multifunctions of the recent image forming apparatus, so that an amount of information which can be displayed is limited as compared with the amount of information to be displayed.

In an image forming apparatus to which an application can be downloaded and added, for example, there are the following problems such that buttons (select keys) to select a plurality of applications are displayed on one operation display screen, the number of application select keys which can be added is fairly limited, it is necessary to miniaturize the existing buttons for selecting the applications in association with the addition of the applications, sufficient information to identify the applications cannot be displayed, and the like.

Further, in the conventional image forming apparatus and the control method for such an image forming apparatus, application modules on the first execution environment have been constructed in a manner such that they access a control module of the apparatus via the operation unit or provide some information via a network, respectively, so that there is a further problem of solving a problem such that the module which can use the operation unit is only the application module on the first execution environment or the application module on the second execution environment, and an application which uses the operation unit cannot be formed on each execution environment.

SUMMARY OF THE INVENTION

The invention is made in consideration of at least one of the above problems. It is an object of the invention to provide a mechanism such that in a display unit of an image forming apparatus, a function for displaying can be flexibly changed in accordance with a change in program in the image forming apparatus so as to utilize the limited display unit.

Another object of the invention is to provide a mechanism such that when a program is inputted into an image forming apparatus, a display screen for selecting an application is automatically increased and the display screen is displayed so that it can be switched from an existing display screen.

Still another object of the invention is to provide a mechanism such that when a program in an image forming apparatus is deleted, unnecessary display screens are automatically collected and a simple display screen which can be easily handled by the user is provided.

To solve at least one of the foregoing problems, the invention provides the following means.

According to one aspect of the present invention, there is provided an image forming apparatus having a display unit for displaying a program which can be executed in the apparatus so that it can be identified, comprising: input means for inputting a program into the image forming apparatus; display control means for controlling a process for displaying select keys including a plurality of select keys to instruct a selection of a desired one of a plurality of programs which are stored in the image forming apparatus onto a display screen which is displayed on the display unit; and discriminating means for discriminating whether the select key to instruct a selection of the program inputted by the input means can be further displayed onto a first display screen to display the select keys corresponding to the programs which have already been registered in the image forming apparatus in response to the input of the program from the input means or not.

According to another aspect of the present invention, there is provided an image forming apparatus having a display unit for displaying a program which can be executed in the apparatus so that it can be identified, comprising: deleting means for deleting the program from the image forming apparatus; display control means for controlling a process for displaying select keys including a plurality of select keys to instruct a selection of a desired one of a plurality of programs which are stored in the image forming apparatus onto a display screen of the display unit and controlling a process for displaying, as display screens in the display unit, a first display screen to display a first select key which can instruct a selection of at least one of a plurality of programs stored in the image forming apparatus and a second display screen which can be shifted from the first display screen and includes a second select key which can instruct a selection of at least one of the plurality of programs; and discriminating means for discriminating whether the first select key and the second select key can be displayed as one display screen onto the display screen in the display unit in response to the deletion of the program in the image forming apparatus by the deleting means or not.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 11 is a diagram showing application information which is managed by the application management application;

FIG. 19 is a diagram showing an example of processes which are executed after an application additional routine was activated.

DETAILED DESCRIPTION OF THE PREFERRED EMBODIMENT

A preferred example of an embodiment of the invention will be described hereinbelow with reference to the drawings.

Figure 1:
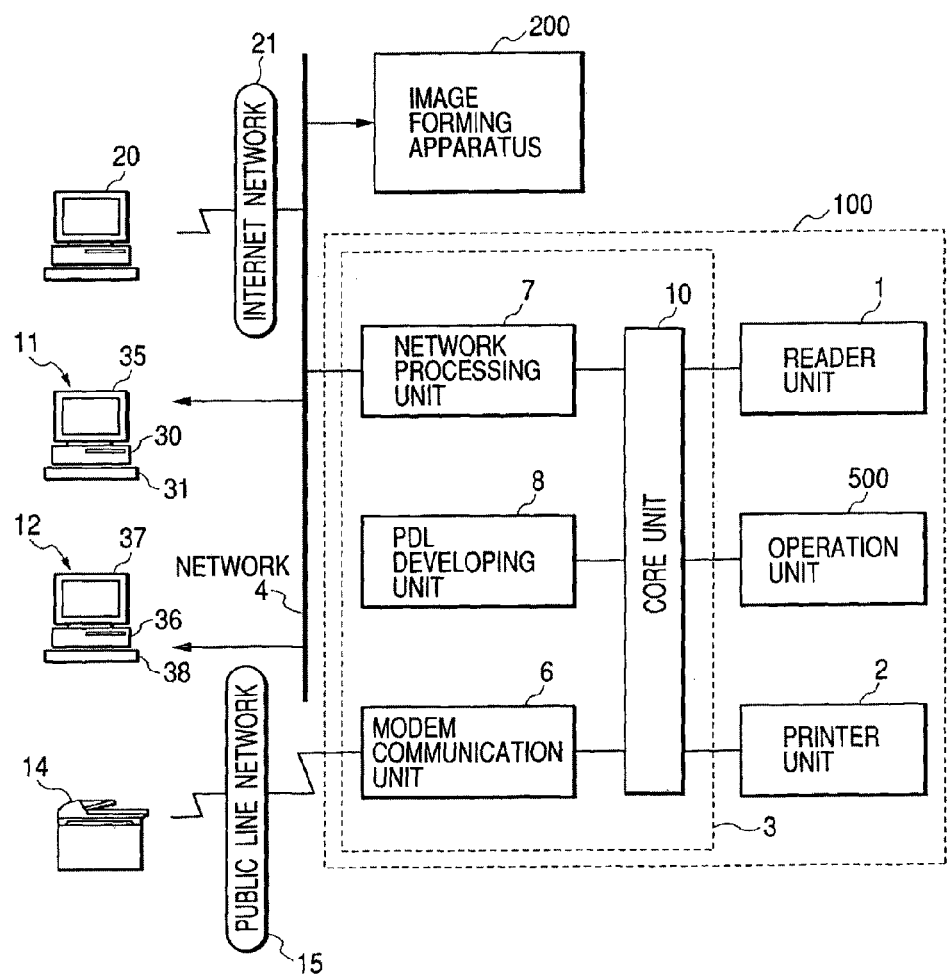
FIG. 1 is a block diagram of a system including a copying apparatus, another image forming apparatus, and computers.

FIG. 1 is a block diagram of a system including a copying apparatus, another image forming apparatus, and computers. FIG. 1 shows relations among a copying apparatus and the like as preferred examples of image forming apparatuses (image processing apparatuses) of the invention, information processing apparatuses (computers), and peripheral apparatuses. Each of image forming apparatuses 100 and 200 comprises a reader unit 1, a printer unit 2, and a controller unit 3. The controller unit 3 has therein a modem communication unit 6, a network processing unit 7, a PDL developing unit 8, and a core unit 10. A workstation or a standard personal computer (PC) can be used as a computer.

The reader unit 1 reads an image of an original set the image forming apparatus and outputs image data corresponding to the original image to the printer unit 2 via the core unit 10. The printer unit 2 records an image corresponding to the image data from the reader unit 1 onto recording paper.

Each of computers 11 and 12 is shown as an example of the information processing apparatuses and is a personal computer or a workstation (PC/WS). Each of the computers 11 and 12 transmits PDL print data to the core unit 10 via a network 4 and the network processing unit 7. The PDL developing unit 8 develops the received PDL print data into image data which can be recorded by the printer unit 2. An image corresponding to the image data is printed by the printer unit 2 via the core unit 10.

Reference numeral 14 denotes a facsimile (FAX) apparatus. For example, the FAX apparatus 14 transmits the original image read by the reader unit 1 via a public line network 15, modem communication unit 6, and core unit 10, or the FAX apparatus 14 receives image data from the other computer 12 via the public line network 15, modem communication unit 6, and core unit 10. The received image is printed by the printer unit 2 (printer engine unit 2).

As an example of storing means of the information processing apparatuses of the invention, there are hard disks 30 and 36 in the computers 11 and 12. Reference numerals 35 and 37 denote display apparatuses of the computers 11 and 12, for example, LCD displays. Reference numerals 31 and 38 denote input devices such as keyboards of the computers 11 and 12. The construction in FIG. 1 is shown as an example and the system construction is not limited to it.

Figure 2:
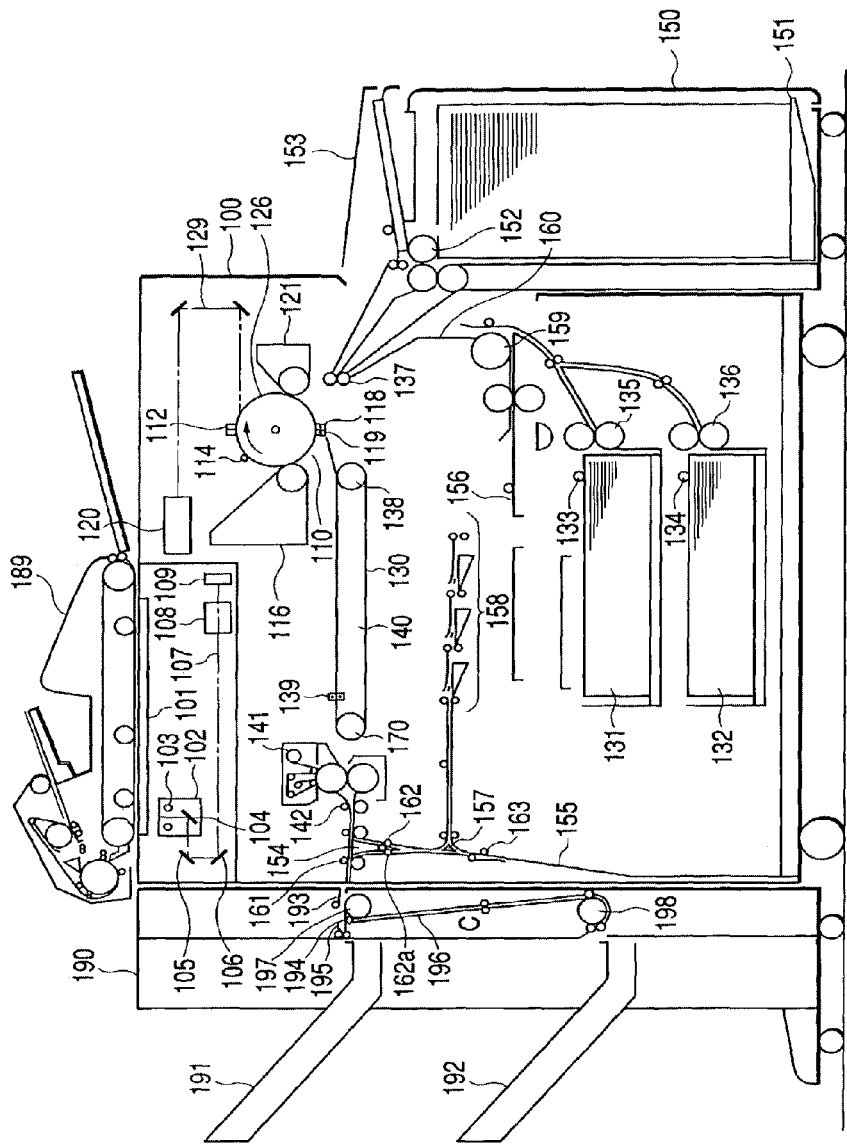
FIG. 2 is a cross sectional view showing an example of copying apparatus main bodies 100 and 200 suitable for the image forming apparatus.

FIG. 2 is a cross sectional view showing an example of the copying apparatus main bodies 100 and 200 suitable for the image forming apparatus according to the invention. As an example of the image forming apparatus, there is a printer, a scanner, or a facsimile. As an example of means for controlling the image forming apparatus, there is a method whereby a predetermined memory area in an HDD which the copying apparatus has is provided as a box and image data in the box is processed. The image forming apparatus according to the invention is mainly constructed by the image forming apparatus main body (copying apparatus main body) 100, a deck 150, and a recirculating automatic document feeder (RDF) 189.

The image forming apparatus main body 100 comprises: a platen glass 101; a scanner 102; scanning mirror 105 and 106; a lens 108; a CCD sensor (image sensor unit) 109; a photosensitive drum 110; a primary charger 112; a preexposure lamp 114; a cleaning device 116; a transfer charger 118; an exposure control unit 120; a developing unit 121; a transfer belt 130; an upper cassette 131; a lower cassette 132; pickup rollers 133 and 134; paper feed rollers 135 and 136; a resist roller 137; an adsorption charger 138; a transfer belt roller 170; prefixing chargers 139 and 140; a fixing unit 141; a paper ejection roller 142; a paper ejection flapper 154; a reversal path 155; a paper refeed tray 156; multiple flapper 157; a conveyance path 158; a paper feed roller 159; a path 160; an ejection roller 161; a first feed roller 162; a second feed roller 162a; and a reversal roller 163. The above construction will be described in detail. The reader unit 1 in FIG. 1 mentioned above corresponds to a block comprising the platen glass 101 to the CCD sensor 109 in FIG. 2. The printer unit 2 in FIG. 1 mentioned above corresponds to a block comprising the photosensitive drum 110 to the reversal roller 163 in FIG. 2.

First, the reader unit 1 will be described hereinbelow. The platen glass 101 is an original mounting base plate. The scanner 102 comprises an original illumination lamp 103, a scanning mirror 104, and the like. When the scanner 102 is reciprocated and scanned in a predetermined direction by a motor (not shown), reflection light 107 of the original is transmitted through the lens 108 via the scanning mirrors 104 to 106, thereby forming an image onto the CCD sensor 109. The image is converted into an electric signal by the CCD sensor 109. The signal is A/D converted and shading-corrected by a scanner image processing unit (not shown) arranged near the CCD sensor 109. The resultant processed signal is stored as digital image data into a memory 324 via a gate array 326 of the core unit 10, which will be explained hereinlater.

The printer unit 2 will be subsequently explained in detail. The exposure control unit 120 is constructed by a laser beam generator, a polygon scanner, and the like. The digital image data stored in the memory 324 of the core unit 10 is read out from the memory. The gate array 326 of the core unit 10, which will be explained hereinlater, converts the digital image data into a video signal and sends it to the printer unit via an interface (I/F) 325. A laser beam 129 modulated on the basis of the video signal is irradiated onto the photosensitive drum 110. The primary charger 112, the developing unit 121, transfer charger 118, cleaning device 116, and preexposure lamp 114 are arranged around the photosensitive drum 110. In an image forming unit 126 around the photosensitive drum 110 as a center, the photosensitive drum 110 is rotated in the direction shown by an arrow in the diagram by a motor (not shown). After the photosensitive drum was charged to a desired electric potential by the primary charger 112, the laser beam 129 from the exposure control unit 120 is irradiated onto the drum, so that an electrostatic latent image is formed.

Transfer paper which has been picked up from the upper cassette 131 or the lower cassette 132 and fed by the pickup roller 133 or 134 is conveyed to the apparatus main body by the paper feed roller 135 or 136. The paper is fed to the transfer belt by the resist roller 137. The visualized toner image is transferred onto the transfer paper by the transfer charger 118. The toner remaining on the surface of the photosensitive drum 110 after the transfer is removed therefrom by the cleaning device 116, so that the drum surface is cleaned. Residual charges on the drum surface are discharged by the preexposure lamp 114. The transfer paper after the transfer is separated from the transfer belt 130. The toner is charged again by the prefixing chargers 139 and 140. Subsequently, the paper is sent to the fixing unit 141, fixed by pressure and heat, and ejected to the outside of the main body 100 by the paper ejection roller 142.

The adsorption charger 138 allows the transfer paper sent from the resist roller 137 to be adsorbed to the transfer belt 130. The transfer belt roller 170 is used to rotate the transfer belt 130 and, at the same time, allows the transfer paper to be adsorbed and charged onto the transfer belt 130 in cooperation with the adsorption charger 138 as a pair.

A deck 150 in which, for example, 4000 sheets of transfer paper can be stacked is attached to the image forming apparatus main body 100. A lifter 151 of the deck 150 is elevated in accordance with a quantity of transfer paper stacked in the deck so that the transfer paper is always come into contact with a paper feed roller 152. A multi manual insertion tray 153 in which, for example, 100 sheets of transfer paper can be stacked is attached to the image forming apparatus main body 100.

The paper ejection flapper 154 switches a path on the duplex recording side or the multiple recording side and a path on the paper ejection side. The transfer paper fed out from the paper ejection roller 142 is switched to the path on the duplex recording side or the multiple recording side by the paper ejection flapper 154. The multiple flapper 157 switches the path on the duplex recording side or the path on the multiple recording side. By inclining the multiple flapper 157 to the left, the transfer paper is directly guided to the conveyance path 158 without passing through the reversal path 155. The paper feed roller 159 feeds the transfer paper to the photosensitive drum 110 side via the path 160.

The ejection roller 161 is arranged near the paper ejection flapper 154 and ejects the transfer paper switched to the ejection side by the paper ejection flapper 154 to the outside of the apparatus.

In the duplex recording (duplex copy) mode, the paper ejection flapper 154 is lifted upward, the multiple flapper 157 is inclined to the right, and the recorded (copied) transfer paper is reversed by the reversal path 155. After that, the multiple flapper 157 is inclined to the left and the transfer paper is stacked onto the paper refeed tray 156 in a upside-down state via the conveyance path 158. In the multiple recording (multiple copy) mode, the paper ejection flapper 154 is lifted upward, the multiple flapper 157 is inclined to the left, the recorded (copied) transfer paper is fed via the conveyance path 158, and thereafter, the transfer paper is stacked onto the paper refeed tray 156. The sheets of transfer paper stacked on the paper refeed tray 156 are picked up one by one from the bottom and guided to the resist roller 137 of the main body by the paper feed roller 159 along the path 160.

When the transfer paper is reversed and ejected from the main body, the paper ejection flapper 154 is lifted upward, the multiple flapper 157 is inclined to the right, and the recorded (copied) transfer paper is conveyed to the conveyance path 158 side. After a rear edge of the transfer paper passes the first feed roller 162, the transfer paper is conveyed to the second feed roller 162a side by the reversal roller 163. The transfer paper is turned over and ejected to the outside of the apparatus by the ejection roller 161. The transfer paper ejected to the outside of the apparatus is conveyed to a finisher 190.

The finisher 190 is used to stack the transfer paper printed in the image forming apparatus 100. Reference numeral 193 denotes a path to receive the transfer paper printed in the image forming apparatus 100. A roller 197 is used to feed the transfer paper conveyed from the path 193 onto a path 195 or 196. To feed the paper to the path 195, a paper ejection flapper 194 is moved downward. To feed the paper to the path 196, the paper ejection flapper 194 is moved upward. When the transfer paper passes through the path 196, it is ejected onto a bin 192 by a roller 198. When the path 195 is selected, the transfer paper is ejected onto the bin 192 as it is. For example, if the copy is performed, the transfer paper is ejected onto a bin 191. If the PDL print is performed, the transfer paper is ejected onto the bin 192. Thus, convenience for the user is improved.

Figure 17:
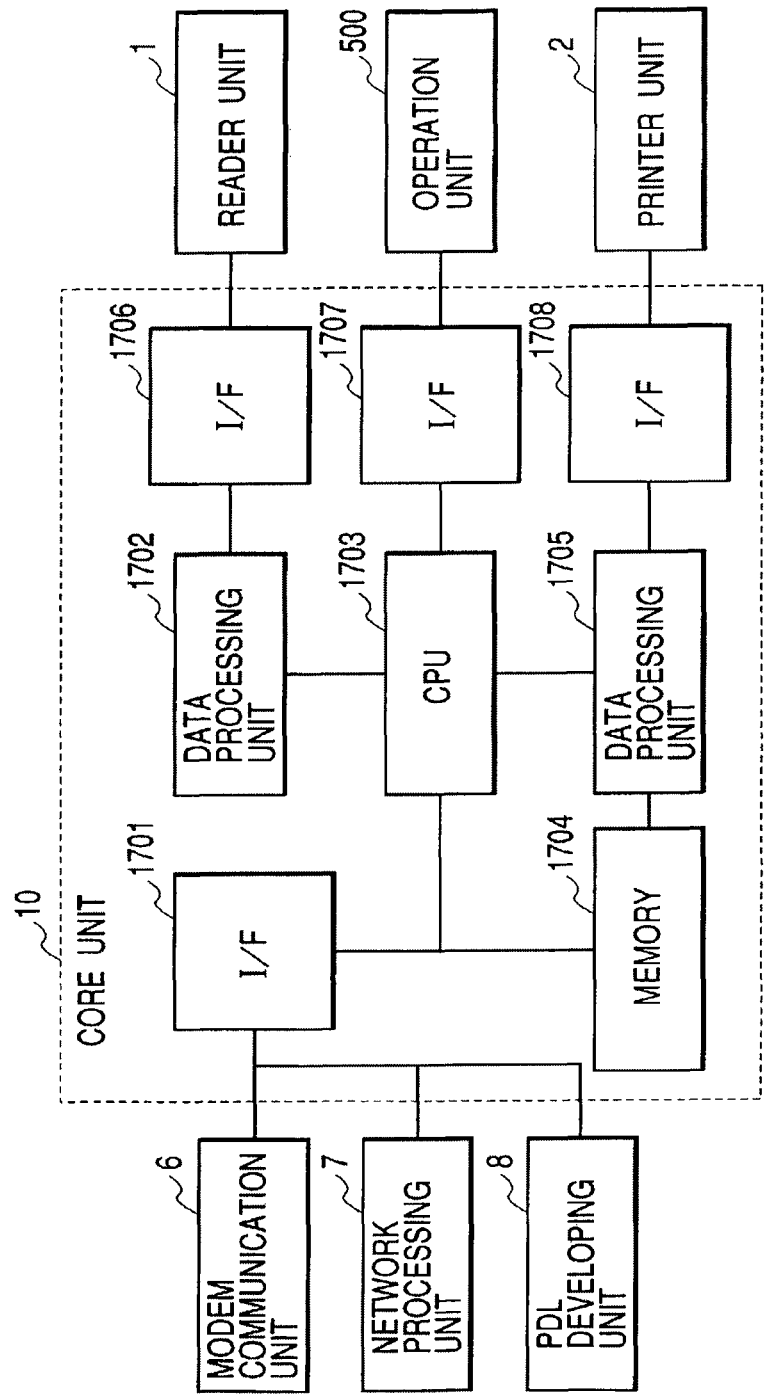
FIG. 17 is a block diagram showing a construction of the core unit 10 of the image forming apparatus.

FIG. 17 is a block diagram showing a construction of the core unit 10 of the image forming apparatus according to the invention. The core unit 10 comprises: interface units 1701, 1706, 1707, and 1708; data processing units 1702 and 1705; a CPU 1703 (each control means); and a memory 1704 (storing means).

The above construction will be described in detail. The image data from the reader unit 1 is transferred to the data processing unit 1702 via the I/F 1706. The data processing unit 1702 executes image processes such as rotating process, zooming process, or the like of an image. The image data transferred to the data processing unit 1702 is accumulated as digital image data into the memory 1704 via the CPU 1703. The image data is transferred to the printer unit 2 via the CPU 1703, data processing unit 1705, and I/F 1708 in accordance with a control command which is generated from the operation unit 500 as a preferred example of the display unit of the invention, or the image data is transferred to the modem communication unit 6 and the network processing unit 7 via the I/F unit 1701. The operation unit 500 is constructed by using, for example, a liquid crystal panel. The liquid crystal panel has a function of a touch pad. When the operator (user) touches this panel, a key corresponding to a predetermined command or setting can be selected.

Code data indicative of the image inputted via the network processing unit 7 is transferred to the CPU 1703 via the I/F unit 1701. If the CPU determines that the transferred code data is a PDL code, the PDL code is transferred to the PDL developing unit 8 via the I/F unit 1701 and developed into image bit map data here. The image bit map data is accumulated into the memory 1704 via the I/F unit 1701 and CPU 1703. After that, the data is transferred to the printer unit 2 via the CPU 1703, data processing unit 1705, and I/F unit 1708 and printed.

FAX image data from the modem communication unit 6 is transferred to the data processing unit 1705 via the I/F unit 1701 and CPU 1703 and, thereafter, it is transferred to the printer via the I/F unit 1708.

The CPU 1703 makes the control as mentioned above in accordance with a control program stored in the memory 1704 and the control command received from the operation unit 500 via the I/F unit 1707. The memory 1704 is also used as a work area of the CPU 1703. As mentioned above, in the image forming apparatus, processes in which functions such as reading of the original image, print of the image, transmission/reception of the image, storage of the image, input/output of the data to/from the computer, and the like are combined can be executed by the core unit 10 of image input/output control unit 3 as a center. The interface unit (I/F unit) 1701 as a preferred example of the input means of the invention can download various applications and control programs from a server or another image forming apparatus on an external network and store them into the memory 1704. There is a detachable memory slot (not shown) as a preferred example of other input means. Programs can be also downloaded from a portable memory medium such as flexible disk, IC card, DVD, CD-ROM, or the like connected to the memory slot besides the network and stored into the memory 1704.

Figure 3:
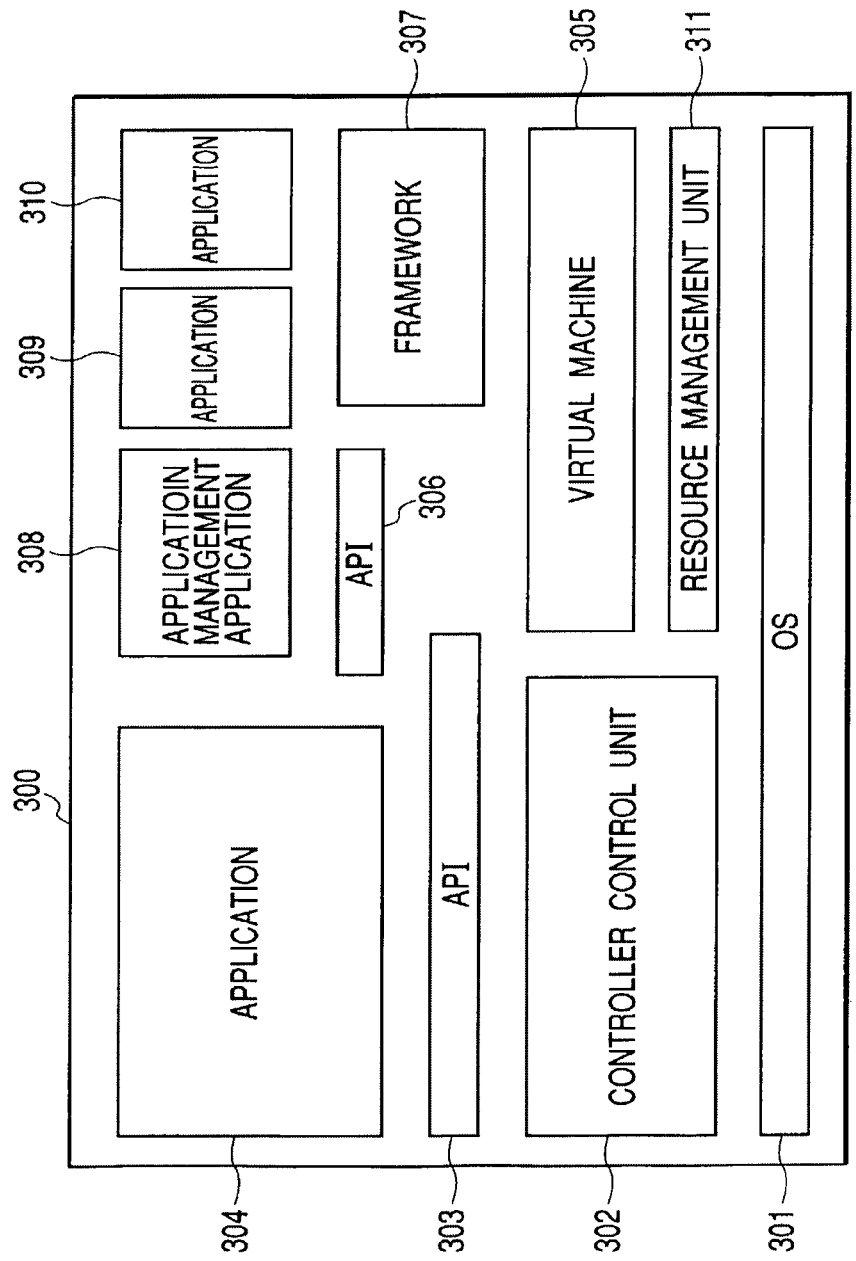
FIG. 3 is a block diagram of a core unit 10 of the hybrid apparatus 100 as an example of the image forming apparatus.

FIG. 3 is a software structure diagram 300 stored in the core unit 10 of the hybrid apparatus 100 as an example of the image forming apparatus of the invention.

Reference numeral 301 denotes an example of a first execution environment of the invention to control the whole image forming apparatus. Generally, the first execution environment 301 is each module of a real-time OS which can control various functions of a copying apparatus in a real-time manner or a library group which can instruct the CPU to critically control various functions including optional devices and an extension card of the copying apparatus. The first execution environment is realized by a module group for providing interface commands to the application which operates at an upper level of them. Reference numeral 302 denotes a controller control unit which operates on the first execution environment 301. It is assumed that the controller control unit 302 is constructed by modules for controlling the reader unit 1, printer unit 2, modem communication unit 6, PDL developing unit 8, and the like.

Reference numeral 303 denotes an application programming interface (hereinafter, referred to as an API). The application programming I/F 303 has a function for executing a process to access the controller control unit 302 by this interface and a function for transmitting control commands to the hybrid apparatus 200 or the like via the network processing unit 7 and the network 4 in response to a command train from the applications. Reference numeral 304 denotes an application which operates on the first execution environment 301. The application 304 can request the controller control unit 302 to execute various processes by using the API 303. The application 304 can also communicate with the computers (information processing apparatuses) 11, 12, and 20 on the network 4 via the network processing unit.

Reference numeral 305 denotes a second execution environment which is optimum to execute a specific application. For example, it is realized by a virtual machine or the like of Java (registered trademark). Reference numeral 306 denotes an API for allowing the application on the second execution environment 305 of the invention to access the controller control unit 302 which operates on the real-time OS 301 as a first execution environment. In the embodiment, the API 306 has a function of a conversion module to call the API 303 and a function for transmitting the control command to the image forming apparatus 200 or the like via the network processing unit 7 and the network 4.

Reference numeral 307 denotes a framework module having a function for integratedly controlling the application on the second execution environment 305. Reference numeral 308 denotes an application for managing other application on the second execution environment 305 of the invention. The application management application 308 executes download, upload, deletion, and invalidation of applications 309 and 310, which will be explained hereinlater, in cooperation with the framework module 307.

Reference numerals 309 and 310 denote the applications which operate on the second execution environment 305. The applications 309 and 310 request the controller control unit 302 to execute various processes by using the API 306 and can also communicate with the information processing apparatuses 11, 12, and 20 on the network 4 via the network processing unit 7.

Reference numeral 311 denotes a resource management unit for managing resources which are used by the second execution environment 305 of the invention. The resource management unit 311 operates on the real-time OS 301 for realizing the first execution environment. When the virtual machine 305 itself for realizing the second execution environment, the API 306, the framework module 307, or all applications on the OS 305 use the resources such as a memory and the like, the resource management unit 311 limits the resources so that the resources of a predetermined amount or more cannot be used.

First, the API 303 will be explained. The API 303 is a set of interfaces on the real-time OS 301 respectively corresponding to a plurality of control commands for accessing the controller control unit 302 which is controlled by the real-time OS 301 as a first execution environment. Each of the interfaces corresponding to the control commands has parameters to designate a target apparatus for executing the control command and the controller control unit 302 in the same apparatus and, further, the controller control unit 302 of the image forming apparatus 200 connected by the network 4 can be designated as targets of designation.

Figure 4:
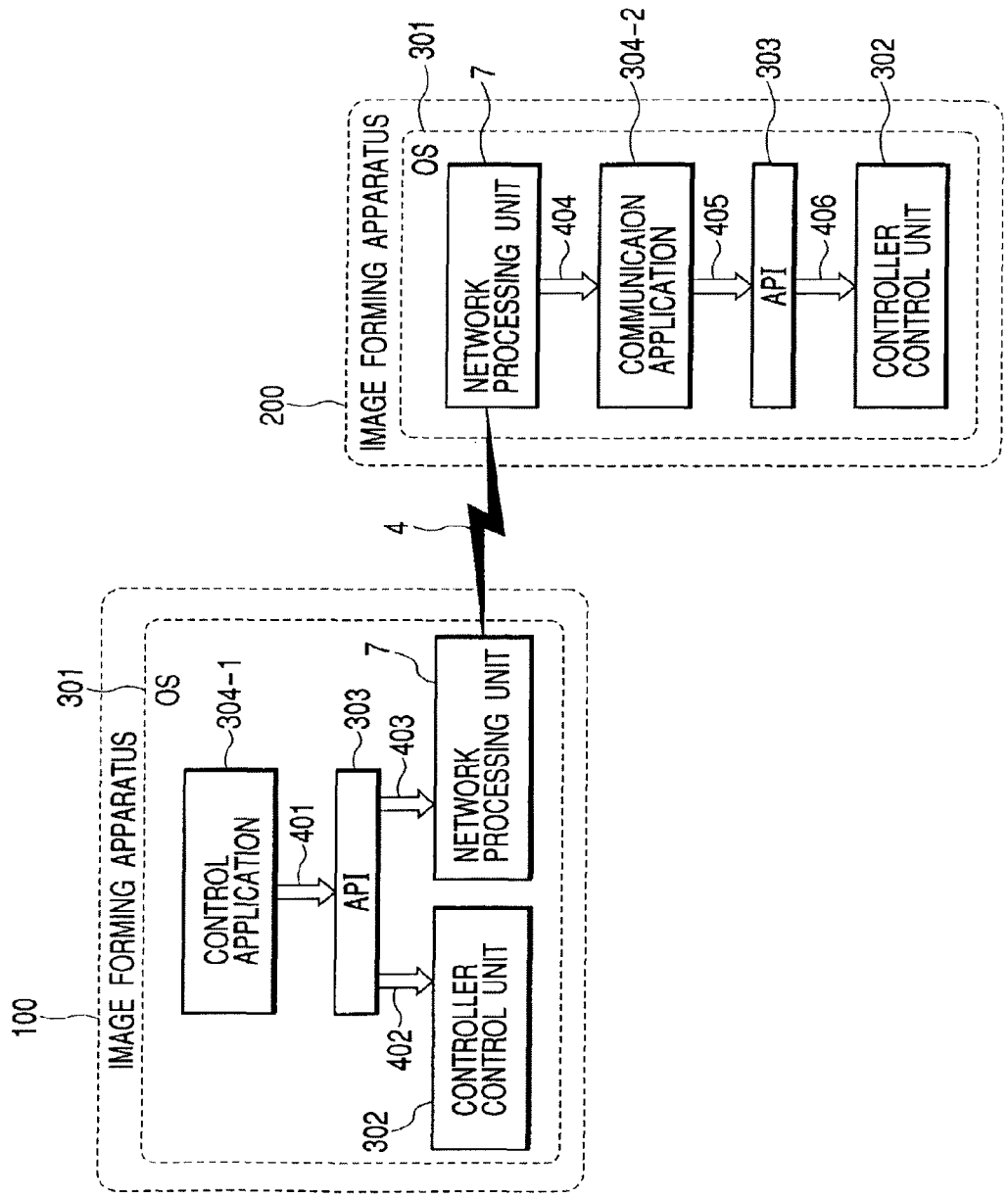
FIG. 4 is a diagram showing the operation for calling a command by using an interface of an API 303.

FIG. 4 is a diagram showing the calling operation of the interface of the API 303. As an API 303, for example, hitherto, in the case where the real-time OS has solely been implemented in the image forming apparatus, there are an interface group or the like according to a printing protocol which can finely control the operation of the image forming apparatus on the real-time OS. In this example, the API 303 is a library group for realizing a network printing protocol.

In the embodiment, it is assumed that an interface A corresponding to a control command A has been called. Although it is assumed here that the command and the interface can be called in a one-to-one correspondence relational manner, it is also possible that a plurality of simple commands are combined and regarded as one new command and it is made to correspond to the interface A. A control application 304-1 calls the interface A of the API 303 (401). An identifier indicative of the image forming apparatus serving as a processing target can be added to the interface A. The API 303 interprets the identifier added to the interface A. If it is determined that the apparatus shown by the identifier is the image forming apparatus itself provided with the API 303, the API 303 executes the command A for the controller control unit 302 and executes the corresponding process in 402. If it is determined that the control target of the command is other than the apparatus (the image forming apparatus 200) on the basis of the similar identification information, the API 303 transmits data in a packet format corresponding to the relevant command of the network 4 via the network processing unit 7 in 403. The network processing unit 7 (obtaining means) of the image forming apparatus 200 obtains the command from the data in the packet format and sends the data of the command A to a communication application 304-2 in 404. The communication application 304-2 recognizes the interface A corresponding to the command A and calls the interface A of the API 303 for the controller control unit 302 as a target in the apparatus in 405.

At this time, the interface A called in 401 and the interface A called in 405 are the same. Since the target of the command exists in the apparatus, the API 303 executes the process corresponding to the command A for the controller control unit 302 in 406. At this time, the process corresponding to the command in 402 and the process corresponding to the command in 406 are the same.

Figure 5:
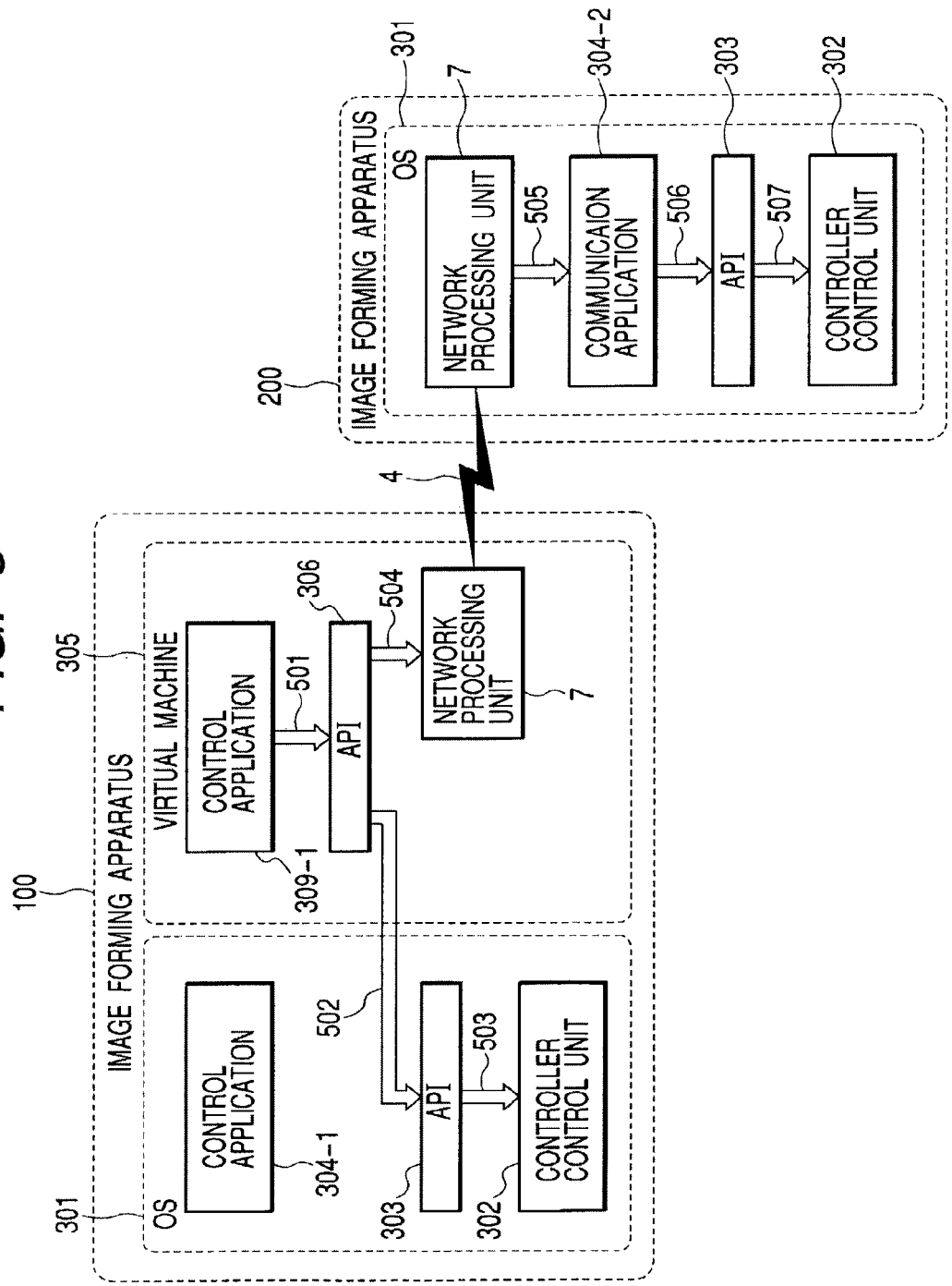
FIG. 5 is a diagram showing the operation of an API 306.

FIG. 5 is a block diagram showing the operation of the API 306. In the embodiment, it is assumed that the interface A has been called as an interface corresponding to the command A for finally instructing the image forming apparatus. Reference numeral 501 shows that a control application 309-1 calls the interface A of the API 306. Portions different from FIG. 4 will be described in detail hereinbelow.

Each interface included in the API 306 is shown as a preferred example of commands in the second format of the invention. Each interface included in the API 303 is shown as a preferred example of commands in the first format of the invention.

First, the API 306 will be described in detail. The API 306 is a set of interfaces on the second execution environment 305 and includes an interface which can call the interfaces which are provided by the API 303. Each of the interfaces corresponding to the commands of the API 306 has parameters to designate a target apparatus for executing the control command in a manner similar to the API 303 and the controller control unit 302 in the same apparatus and, further, the controller control unit 302 of the image forming apparatus 200 connected by the network 4 can be designated as targets of designation.

A case where the interface A which needs to be converted into the first execution environment and executed has been called is considered here. First, if the processing target in which the called interface A is activated exists in the apparatus, the interface of the API 306 is called. When the interface of the API 306 is called, the interface of the API 303 which can be interpreted by the real-time OS 301 is activated and called. When it is called, the interface of the API activates the process corresponding to the command A (502). The API 303 executes the process corresponding to the command to the controller control unit 302 (503). If the target of the command is out of the apparatus (for example, the image forming apparatus 200), a packet on the network 4 corresponding to the command is transmitted via the network processing unit 7 (504). The network processing unit 7 of the image forming apparatus 200 receives the transmitted packet and sends the packet data corresponding to the command A to the communication application 304-2 in 505. The communication application 304-2 calls the interface A of the API 303 for the controller control unit 302 in the apparatus in 506. At this time, the interface A called in 502 and the interface A called in 506 are the same.

In this manner, the API 306 as an interface group which does not depend on each of a difference regarding whether the function to be operated exists in the image forming apparatus or in another image forming apparatus, a difference of the architecture of the apparatuses, and a difference of the OSs can be provided. By utilizing the API 306, merely by learning the system of the API 306 of the execution environment 2, various applications can be developed. Further, since the mechanism such that the API 303 can be called and utilized without an overhead is provided, when the various functions of the image forming apparatus are controlled, if the API 303 as a resource which has already been developed exists, it can be utilized.

Since the target of the command exists in the apparatus, the API 306 executes the process corresponding to the command A for the controller control unit 302 in 507. At this time, naturally, the process corresponding to the command in 503 and the process corresponding to the command in 507 are the same. Naturally, the processes in 404 to 406 and the processes in 505 to 507 are the same and the operation which is executed in the case of using the API 303 and the operation which is executed in the case of using the API 306 are the same.

Figure 18:
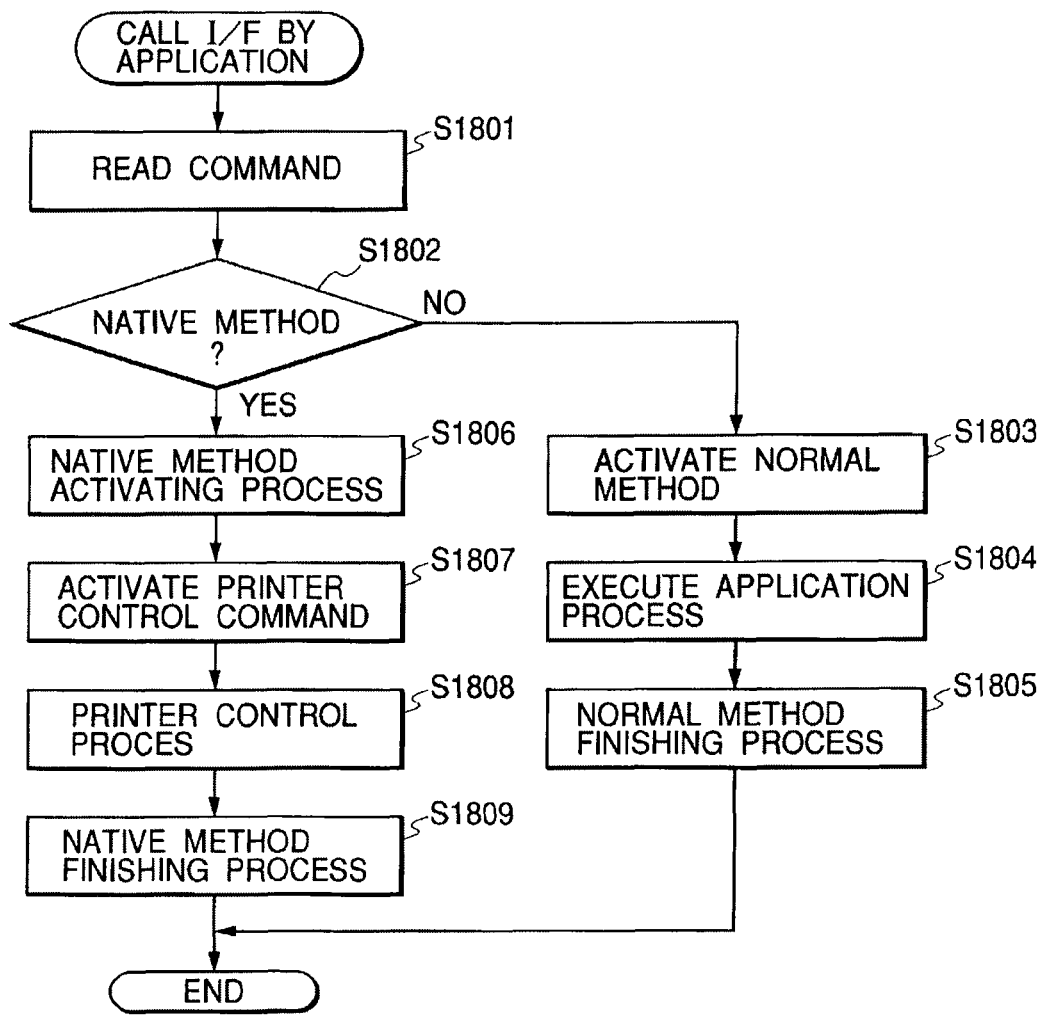
FIG. 18 is a diagram showing an example of an interface calling process in a virtual machine 305.

FIG. 18 is a diagram showing an example of the interface calling process in the virtual machine 305. First, when the application is activated on the virtual machine 305 as a second execution environment and a certain interface is called by an input from the outside of the apparatus, an instruction from the operation unit, or the like, a processing routine of FIG. 18 is started. In step S1801, the called interface is read into the virtual machine 305 and recognized. In step S1802, the virtual machine 305 discriminates whether the recognized interface is a native method as a preferred example of a predetermined command in the second format which can be interpreted in the second execution environment or not. The native method is a method for calling the command in the first format of the invention and it can be interpreted and executed by the real-time OS 301 as an example of the first execution environment. If the virtual machine 305 determines that the called interface is not the native method, it is decided that a normal method has been read, so that it calls the interface by activating the normal method (S1803). According to the normal method, a predetermined application process is executed (S1804) and executes a process for finishing the normal method (S1805). The processing routine is finished. If it is determined in S1802 that the command recognized by the virtual machine 305 in S1801 indicates the native method, S1806 follows. The virtual machine 305 executes a native method activating process (S1806) and calls an engine control program as a preferred example of a command train in the first format (it is activated and executed) (S1807). Although "the engine control program which can control the engine unit is called" has been mentioned above, this means that a printer control command is called via the interface included in the API 303 in FIG. 5 and it corresponds to the portion 503 in FIG. 5. A process for controlling the printer is executed in S1808. A process for finishing the native method is executed in S1809. The processing routine of FIG. 18 is finished.

Although "the engine unit is controlled" has been mentioned above, if a video controller unit, a DC controller unit, and a network board are provided as well as various controllers for controlling the engine unit, the control program which is executed in the first execution environment includes a control command for controlling a network board unit and storage contents of a memory in an HDD in the image forming apparatus.

As an application for calling the normal method process, for example, there is an application module for realizing a program in which a critical response is unnecessary, for example, a graphical user interface of an operation panel of a copying apparatus or a printer by software. As a case of calling the native method, there is a case where the printer engine control program calls a process which controls the engine control unit (engine unit) of the copying apparatus, the printer, or the like and in which the critical response is necessary from the application via a native method interface of, for example, Java (registered trademark).

Figure 6:
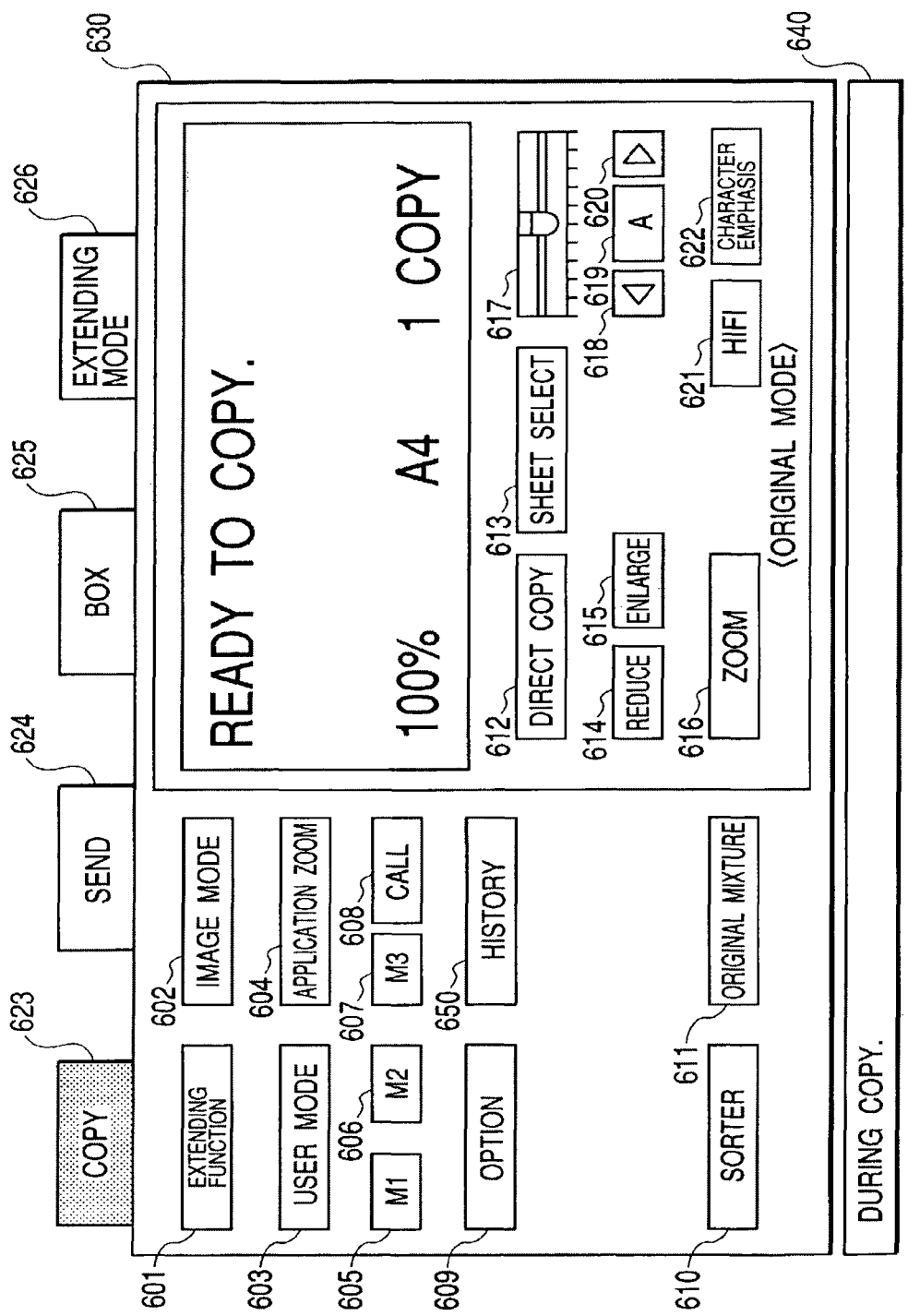
FIG. 6 is an explanatory diagram showing a display screen which is displayed on a display unit of an operation unit 500 of the image forming apparatus according to an embodiment.

FIG. 6 is an explanatory diagram showing a display screen which is displayed on the display unit of the operation unit 500 (refer to FIG. 1) of the image forming apparatus according to the invention. This display screen is displayed to select and execute the application which is executed on the real-time OS 301 as an example of the first execution environment of the invention. This display screen is a touch panel and when the operator (the user) touches a portion in a frame of each function displayed on the touch panel, this function is executed.

A copy mode key 623 is a key which is pressed in the case of executing the copying operation. When the copy mode key 623 is pressed, a display screen of a copy mode shown at 630 in FIG. 6 is displayed.

When an extending function key 601 is pressed, the apparatus enters a mode for setting a duplex copy, a multicopy, movement, a binding margin, frame trimming, or the like.

When an image mode key 602 is pressed, the apparatus enters a setting mode to execute a special process such as meshing, shadowing, trimming, or masking to a copy image.

When a user mode key 603 is pressed, a mode memory can be registered and a default mode display screen can be set.

When an application zoom key 604 is pressed, the apparatus enters a mode for independently zooming an original image in the X and Y directions and a mode for a zoom program to calculate a zoom ratio on the basis of a size of original and a copy size. An M1 key 605, an M2 key 606, or an M3 key 607 is pressed when the user calls a mode memory registered therein. An option key 609 is pressed to set an optional function such as a film projector or the like in order to directly copy an image from a film.

A sorter key 610 is pressed when the user sets a sorting function, a non-sorting function, or a grouping function. An original mixture key 611 is pressed when the user sets an original of the A4 size and an original of the A3 size or an original of the B5 size and an original of the B4 size together onto an original feeder. A direct copy key 612 is pressed to set a copy magnification to 100%. A sheet select key 613 is pressed to select a copy sheet. A reduce key 614 or an enlarge key 615 is pressed to execute a reducing or enlarging process of a regular size. Concentration keys 618 and 620 are used to adjust concentration upon copying. An original image is copied lightly each time the key 618 is pressed and it is copied densely each time the key 620 is pressed. A concentration indicator 617 is provided to indicate a degree of copy concentration. When the concentration key 618 is pressed, a mark of the indicator 617 is moved to the left and when the concentration key 620 is pressed, the mark is moved to the right. An AE key 619 is pressed when the user wants to copy an original such as a newspaper whose texture is dense in an automatic concentration control mode.

A HiFi key 621 is pressed when the user wants to copy an original such as a photograph original in which halftone concentration is dense. A character emphasis key 622 is pressed when the user wants to emphasize characters when a character original is copied. A sending mode key 624 is pressed when the user makes facsimile transmission or the like. A box mode key 625 is pressed to operate data stored in a box. Each of the copy mode key 623, sending mode key 624, and box mode key 625 corresponds to the operation to select the application 304 which is executed on the OS 301.

An extending mode key 626 is a mode key of the invention and pressed to shift the display screen to a display screen (FIG. 7) for selecting and executing the application which is executed on the second execution environment 305 of the invention. Although it is displayed in a manner similar to the case of selecting another mode key in the embodiment, such a display screen can be also displayed so as to be more easily and visually recognized by modifying a size or a design of the key or the like.

A status line 640 displays a message showing a status of the apparatus or print information. In the case of the diagram, it indicates that the copying operation is being executed (during copy). A history key 650 is pressed to display history information of a printed job. For example, information such as end time of a print job, user name, file name, the number of print copies, and the like is displayed.

When the copy mode display screen 630 is displayed, if the execution of the copying operation is instructed by a start key (not shown) or the like, interfaces for performing the start of the process the setting of various parameters, and the like to the API 303 are sequentially called (401). Ordinarily, since the copying operation is instructed into the apparatus, in the API 303, a command is sent to the controller control unit 302 (402), so that the copying operation is executed.

Figure 7:
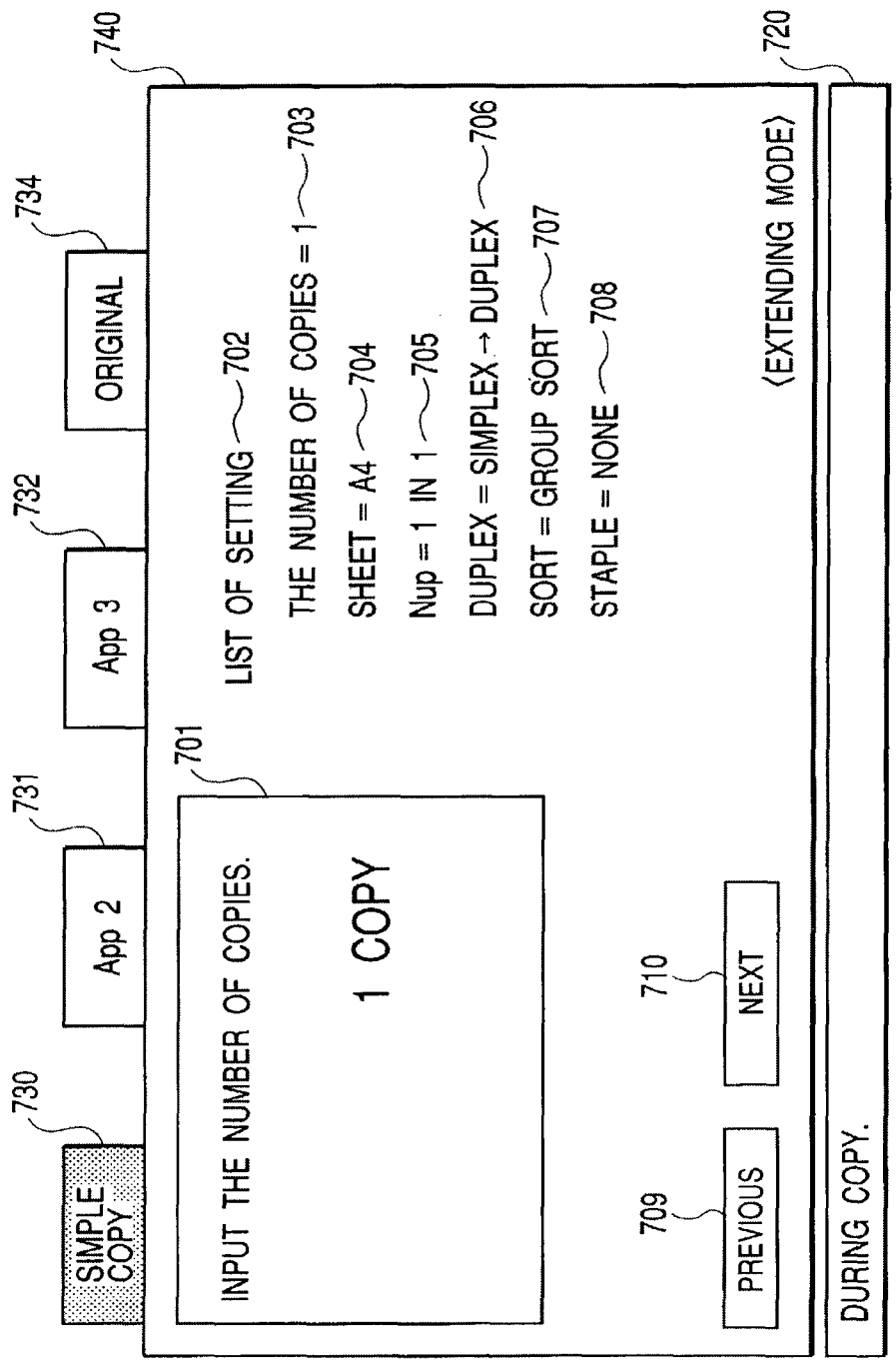
FIG. 7 is an explanatory diagram showing a display screen which is displayed on the display unit of the operation unit 500 of the image forming apparatus shown in FIG. 1.

FIG. 7 is an explanatory diagram showing a display screen which is displayed on the display unit of the operation unit 500 of the image forming apparatus shown in FIG. 1. This display screen is used to select and execute the application which is executed on the second execution environment 305 of the invention. This display screen is a touch panel and when the operator (the user) touches a portion in a frame of each function displayed on the touch panel, this function is executed. A simple copy mode key 730 is pressed to execute the copying operation. By pressing the simple copy mode key 730, a simple copy display screen shown at 740 in FIG. 7 is displayed.

Reference numeral 701 denotes a display screen corresponding to a present set item. Reference numeral 702 denotes a list display for displaying a list of contents of the present set item and contents of set items. The present set item is displayed in an emphasis display form or the like so that it can be visually and easily recognized. In the embodiment, such an emphasis display is realized by displaying the present set item by bold characters. However, a method for the emphasis display is not particularly limited to it but an arbitrary method can be used so long as the selected item can be easily identified. Reference numeral 703 denotes present set contents of the number of copies and 704 indicates present set contents of the sheet.

Reference numeral 705 denotes present set contents of the Nup copy mode; 706 present set contents of the duplex copy mode; 707 present set contents of the sorting mode; 708 present set contents of the stapling mode; and 709 a button which is pressed when the user wants to return the set contents to the previous set contents. The display screen 701 is displayed again so as to show the contents corresponding to the set items. In the embodiment, it is also possible to construct the display screen in a manner such that if the corresponding item does not exist, the button itself is not displayed. A button 710 is pressed when the user wants to advance the set contents to the next set contents. The display screen 701 is displayed again so as to show the contents corresponding to the set items. In a status line 720, a message showing the status of the apparatus or the print information is displayed. In the case of the diagram, it indicates that the copying operation is being executed (during copy).

An App2 mode key 731 or an App3 mode key 732 is pressed to select the application corresponding thereto. An original mode key 734 is a mode key according to the invention and is used to shift the display screen to the display screen (FIG. 6) to select and execute the application which is executed on the real-time OS 301 as an example of the first execution environment of the invention. Although it is displayed in a manner similar to the case of selecting another mode key in the embodiment, such a display screen can be also displayed so as to be more easily and visually recognized by modifying the size or design of the key or the like. When the simple copy mode key 730 is displayed, if the execution of the copying operation is instructed by the start key (not shown) or the like, interfaces for performing the start of the process, the setting of various parameters, and the like to the API 306 are sequentially called (501). Ordinarily, since the copying operation is instructed into the apparatus, the corresponding interface in the API 303 is called (502). The API 303 sends a command to the controller control unit 302 in the apparatus (503), so that the copying operation is executed.

FIG. 11 is a diagram showing application information which is managed by the application management application. When an application, which will be explained hereinlater, is downloaded, each information is stored and when the stored information is erased, it is deleted. Reference numeral 1101 denotes an application name downloaded at present.

Reference numeral 1102 denotes a present status of the application. In FIG. 11, "activate" denotes that the application is being executed at present and "stop" denotes that the application is not executed. Reference numeral 1103 denotes a version of the application; 1104 date/time of the execution of the downloading process; 1105 a storage destination of the downloaded application; and 1106 a type of application. In the diagram, "general" indicates the application which is ordinarily used and "system" indicates the application which is used for a special object.

Reference numeral 1107 denotes a UI, that is, whether something is displayed to the operation unit or not and "yes" denotes that it is displayed; 1108 a version of the framework module 307 necessary for executing the application; and 1109 a version of the API 306 necessary for executing the application. The information which is held as application information is not limited to the above-mentioned information but information or the like of the information processing apparatus on the downloading source side can be also stored.

Figure 8:
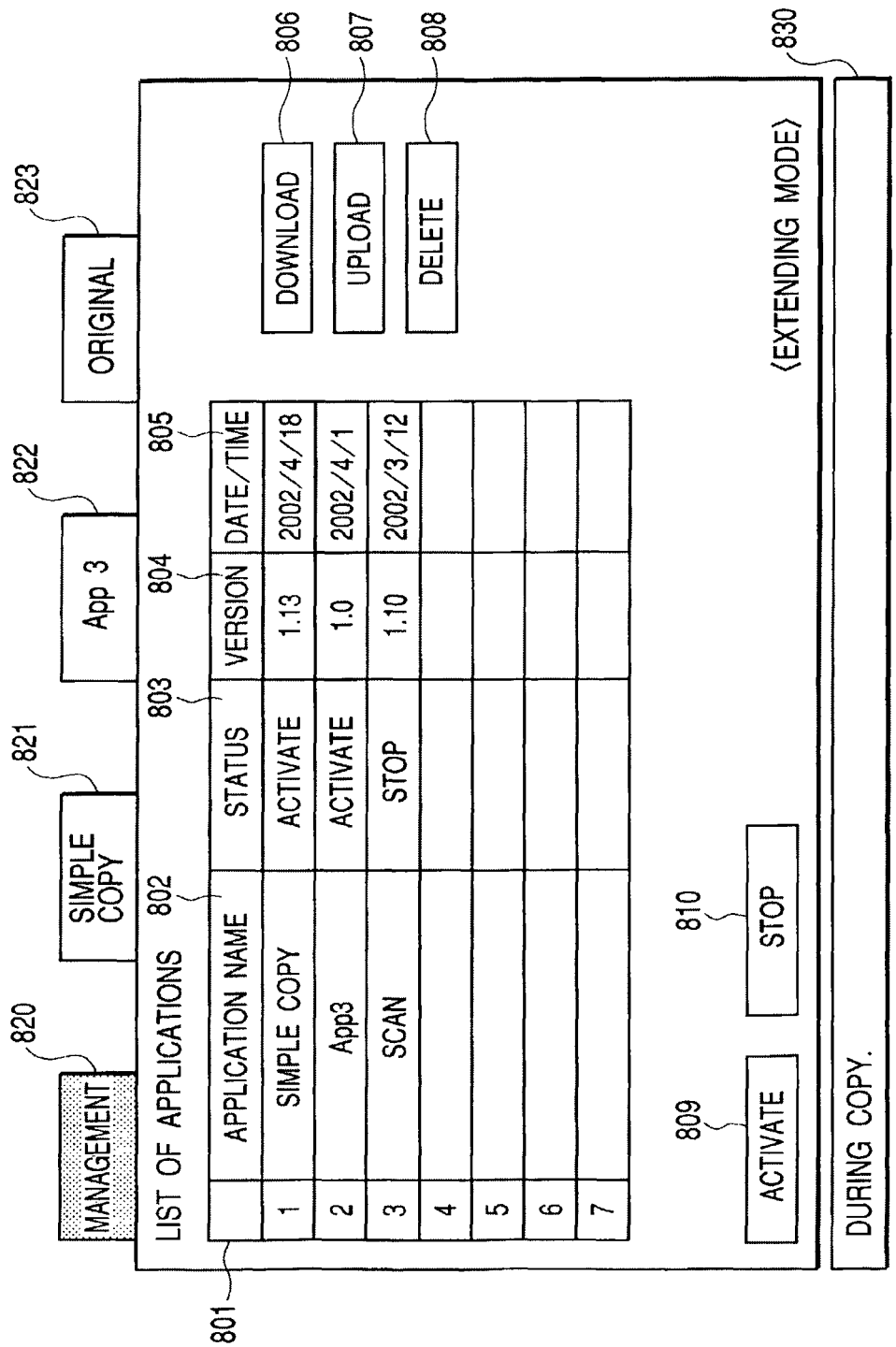
FIG. 8 is a diagram showing an operation display screen of an application management application 308 as a preferred example of application managing means.

FIG. 8 is a diagram showing an operation display screen of the application management application 308 as a preferred example of application managing means of the invention. In the embodiment, since a removable memory medium cannot be directly connected to the image forming apparatus 100, it is assumed that the downloading process is executed from the storing device 30 or 36 of the information processing apparatus 11 or 12. Although the apparatus has been constructed in the embodiment in a manner such that the operator operates from the operation unit 500 on the image forming apparatus 100, the application can be also operated from the information processing apparatus 11 or 12 on the network. Further, although the embodiment has been described with respect to the case where the application managing module of the invention has been embodied on the OS2, naturally, the invention can be also applied to the case of embodying it on the OS1.

Reference numeral 801 denotes a list display for displaying a list of the applications which have already been downloaded. In the embodiment, a list of the applications of the application type 1106 shown in FIG. 11 is generally displayed here. Reference numeral 802 denotes an item showing the name of the application and contents of the application name 1101 are displayed here; and 803 an item showing the present status of the application and contents of the status 1102 are displayed here.

Reference numeral 804 denotes an item showing the version of the application and contents of the version 1103 are displayed here; 805 an item showing the date/time when the application has been downloaded and contents of the date/time 1104 are displayed here; and 806 a download button which is selected when a new application is downloaded. After it is selected, the display screen is shifted to a download display screen (FIG. 9), which will be explained hereinlater. Reference numeral 807 denotes an upload button. By selecting a desired application from the list of the applications and selecting the upload button, the downloaded application is uploaded into a predetermined information processing apparatus. After it is selected, the display screen is shifted to an upload display screen (FIG. 10), which will be explained hereinlater.

Reference numeral 808 denotes a delete button which is selected to delete the application. By selecting a desired application from the list of the applications and selecting the delete button, the application is deleted from the image forming apparatus 100. Reference numeral 809 denotes an application activate button according to the invention. By instructing the framework module 307 to activate a predetermined application, the application in a stop state is activated.

Reference numeral 810 denotes an application stop button according to the invention. By instructing the framework module 307 to stop a predetermined application, the application in an activating state is stopped.

Reference numeral 820 denotes a mode key to select the application management application according to the invention.

Reference numeral 821 denotes a simple copy mode key shown in FIG. 7; 822 an App3 mode key; and 830 a status line to display a message showing the status of the apparatus or the print information. In the case of the diagram, it indicates that the copying operation is being executed (during copy). The contents which are displayed in the application list 801 are not particularly limited to those shown in the embodiment. A display order and a display method are not particularly limited.

Figure 9:
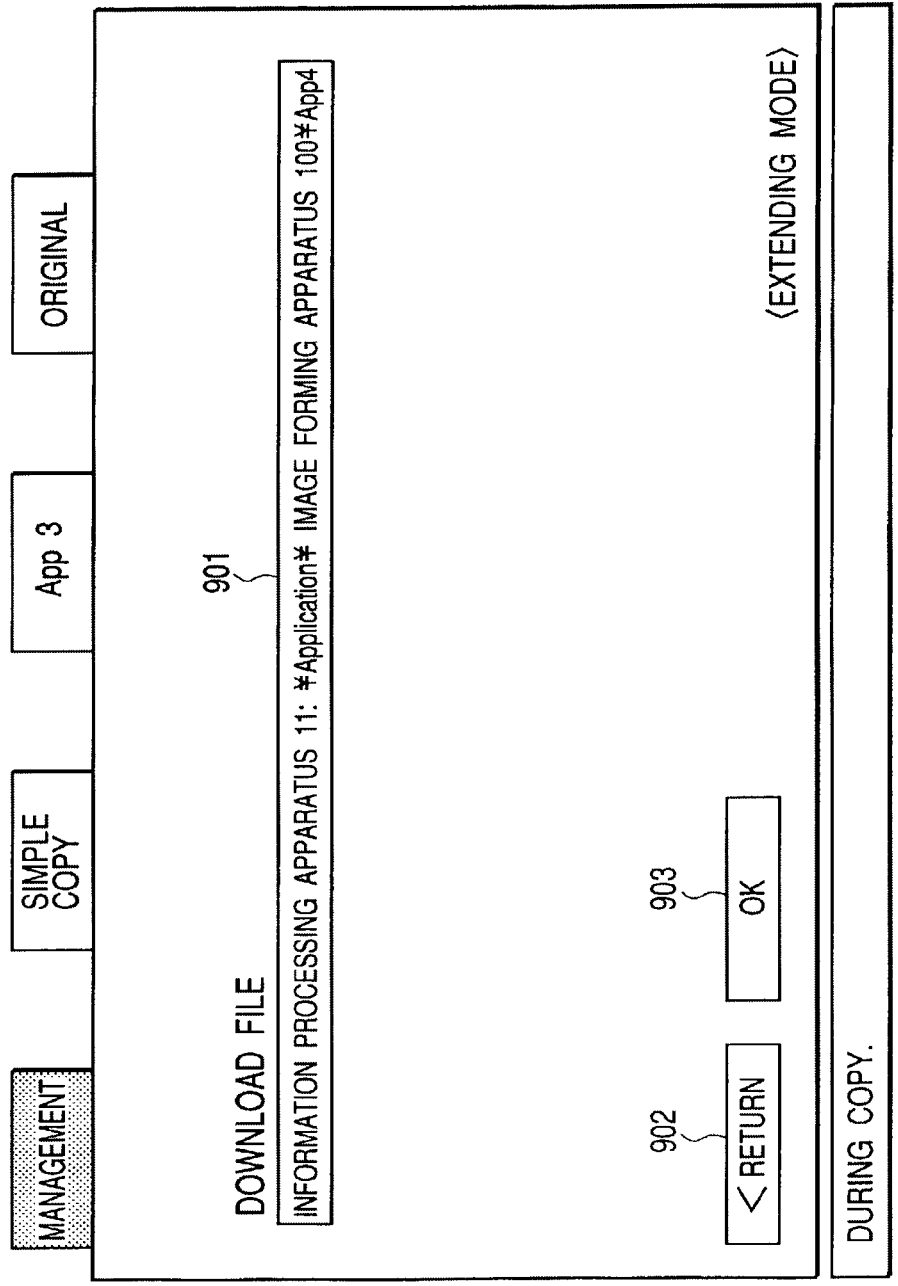
FIG. 9 is a diagram showing an application download display screen of the application management application.

FIG. 9 is a diagram showing an application download display screen of the application management application. In the embodiment, since a removable memory medium cannot be directly connected to the image forming apparatus 100, it is assumed that the uploading process is executed to the storing device 30 or 36 of the information processing apparatus 11 or 12. Although the apparatus has been constructed in the embodiment in a manner such that the operator operates from the operation unit 500 on the image forming apparatus 100, the application can be also operated from the information processing apparatus 11 or 12 on the network.

Reference numeral 901 denotes an input, field to designate the application to be downloaded. In the embodiment, it is assumed that a predetermined application is downloaded from the information processing apparatus 11 connected by the network 4. Reference numeral 902 denotes a button to interrupt the process shown on the display screen and shift the present display screen to the display screen of FIG. 8. Reference numeral 903 denotes a button to instruct the start of the downloading. By pressing the button 903, processes shown in a flowchart (FIG. 12), which will be explained hereinlater, are executed.

A method of designating the application to be downloaded is not particularly limited to the method shown in the embodiment. The apparatus can be also constructed in a manner such that the information processing apparatuses 11, 12, and 20 and the like on the network 4 are visually arranged, the contents of the storing device 30 or 36 in each information processing apparatus are visually displayed, and the target to be downloaded can be selected.

Figure 12:
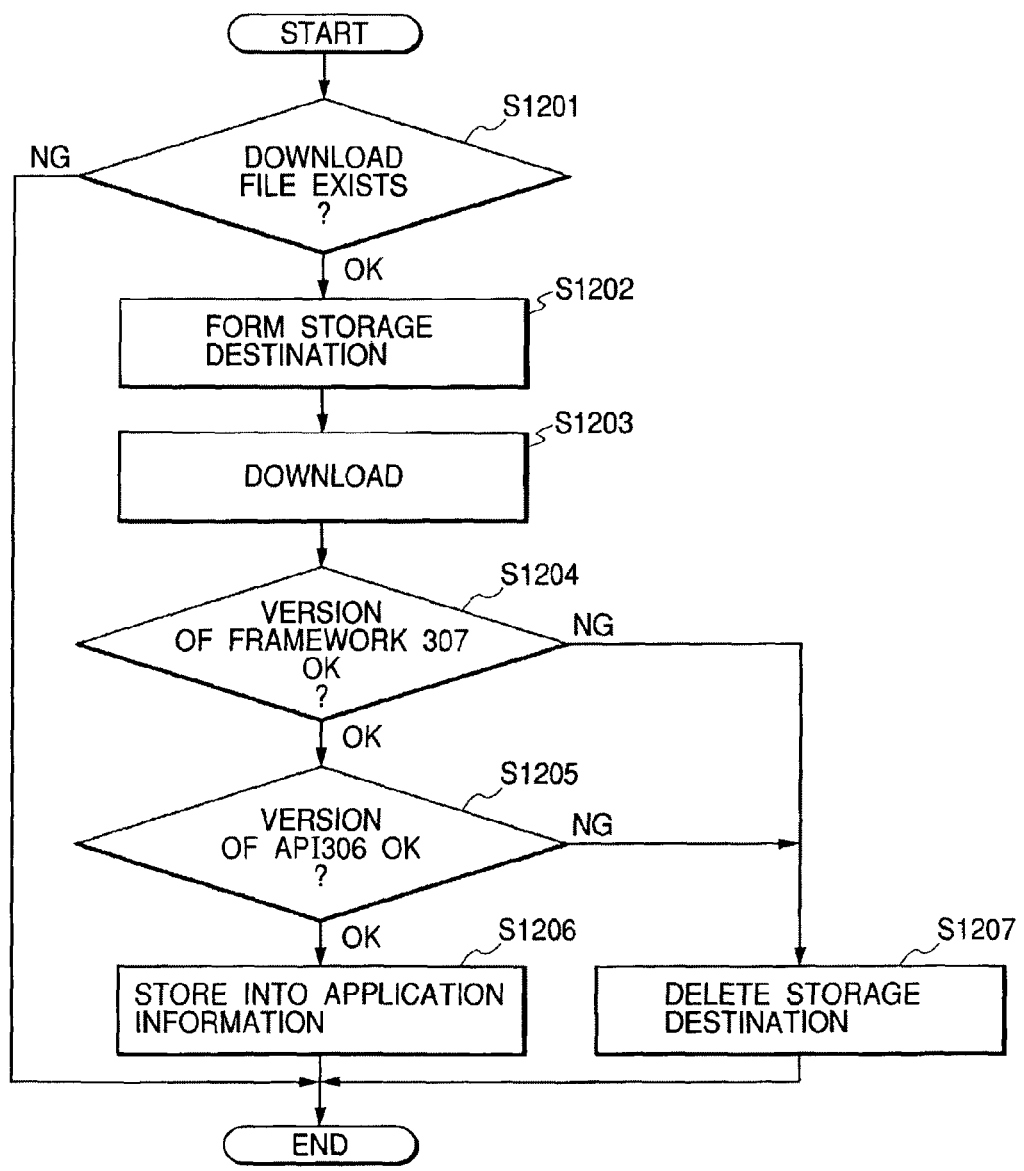
FIG. 12 is a flowchart which is executed when the application management application is downloaded.

FIG. 12 shows a flowchart which is executed when the application management application is downloaded. In step S1201, whether the information which can be downloaded exists in a predetermined position of the information processing apparatus 11 or not is discriminated from data inputted into the input field 901. If OK in step S1201, step S1202 follows. If NG, the processing routine is finished.

In step S1202, a storage destination (location) to store the downloaded data is formed. The stored storage destination is stored into a predetermined area in the memory 1704. In step S1203, the data is downloaded. The predetermined data in the information processing apparatus 11 is downloaded in the field formed in step S1202. The data to be downloaded can be compressed by some means or a plurality of files can be downloaded.

In step S1204, a part of the downloaded data is analyzed and a version of the framework module 307 in the information necessary for executing the downloaded application is discriminated. If OK in step S1204, step S1205 follows. If NG, step S1207 follows. In step S1205, a part of the downloaded data is analyzed and a version of the API 306 in the information necessary for executing the downloaded application is discriminated. If OK in step S1205, step S1206 follows. If NG, step S1207 follows.

In step S1206, the downloaded data is registered as an application which can be operated into the application information in FIG. 11.

In step S1207, the downloaded data is deleted from the memory 1704 because it is determined that the downloaded data is the application which cannot be operated.

Figure 10:
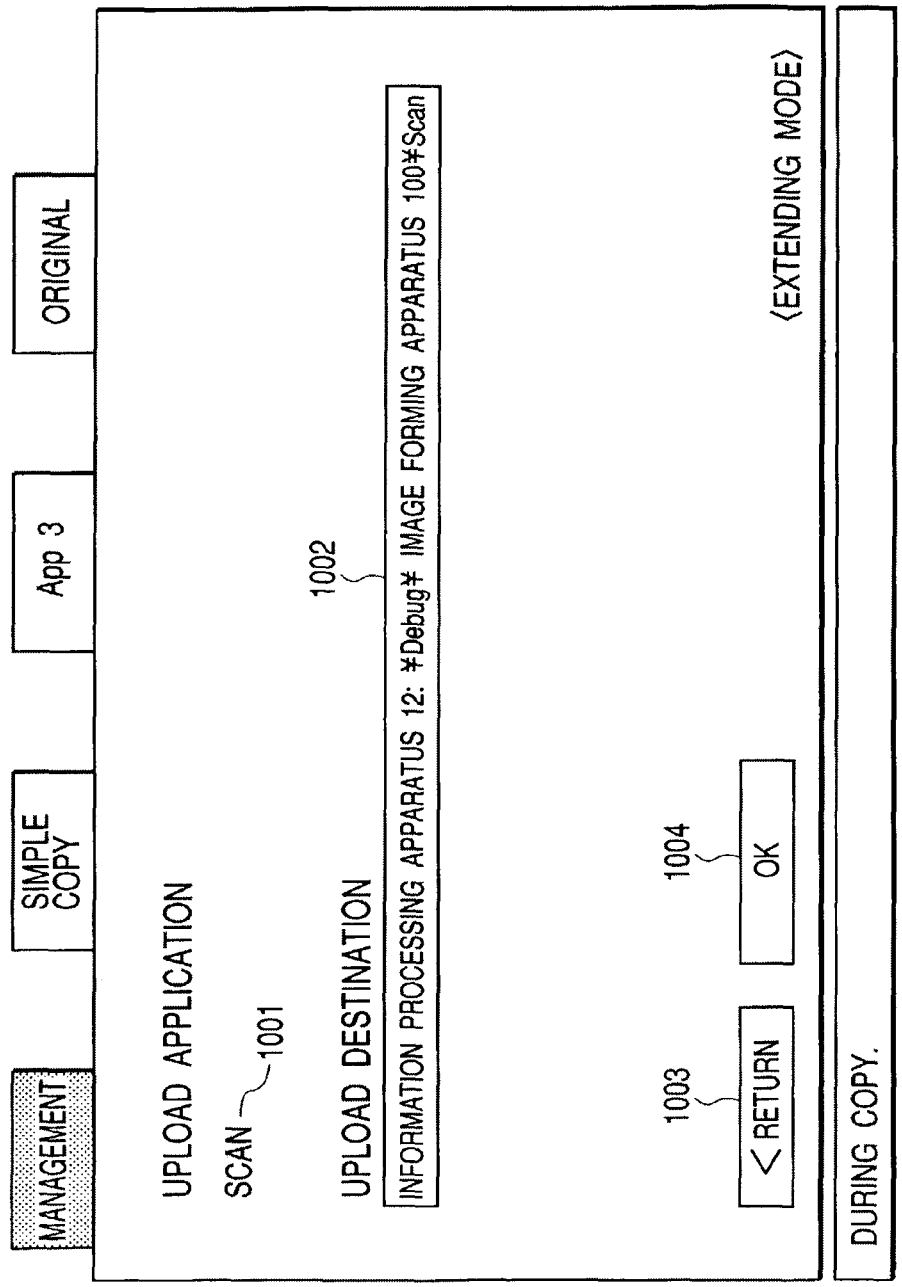
FIG. 10 is a diagram showing an application upload display screen of the application management application of the invention.

FIG. 10 is a diagram showing an application upload display screen of the application management application. Reference numeral 1001 denotes a field showing the application to be uploaded. The application selected in FIG. 8 is displayed. Reference numeral 1002 denotes an input field to designate the information processing apparatus on the upload destination side. In the embodiment, it is assumed that the application is uploaded in a predetermined location in the information processing apparatus 12 connected to the network 4.

Reference numeral 1003 denotes a button to interrupt the process shown on the display screen and shift the present display screen to the display screen of FIG. 8. Reference numeral 1004 denotes a button to instruct the start of the uploading. After the upload destination designated in the input field 1002 was confirmed, all contents downloaded in downloading step S1203 in FIG. 12 are uploaded. A designating method of the information processing apparatus on the upload destination side is not particularly limited to the method shown in the embodiment. The apparatus can be also constructed in a manner such that the information processing apparatuses 11, 12, and 20 and the like on the network 4 are visually arranged, the contents of the storing device 30 or 36 in each information processing apparatus are visually displayed, and the upload destination can be selected.

Figure 13:
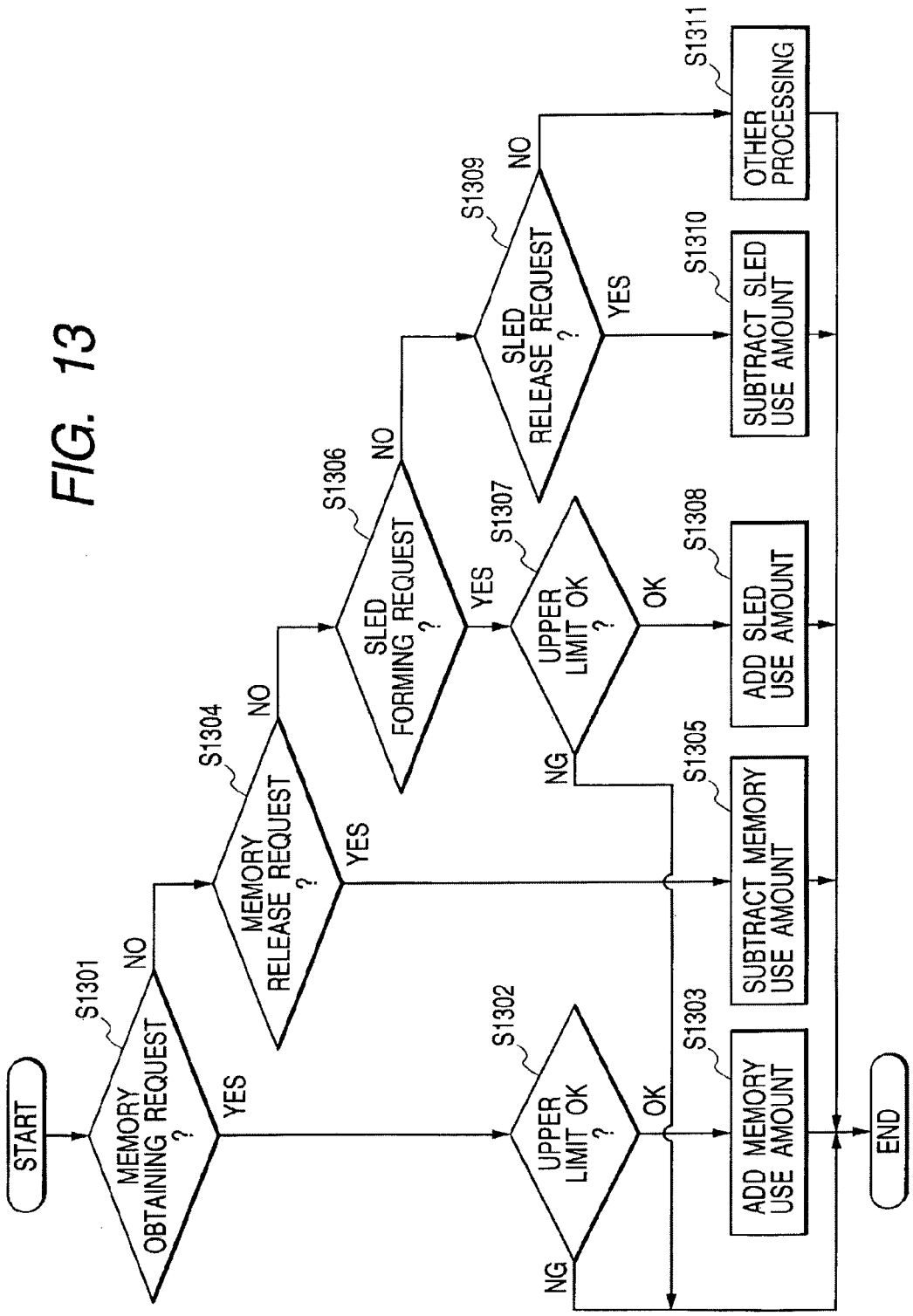
FIG. 13 is a flowchart showing a part of processes which are executed by a resource management unit 311.

FIG. 13 is a flowchart showing a part of processes which are executed by the resource management unit 311 as a preferred example of the resource managing means of the invention.

In step S1301, a memory obtaining request has been made via the OS 305 or not is discriminated. If YES, step S1302 follows. If NO, step S1304 follows. In step S1302, a size in which the sum of the memory obtaining requests made so far via the OS 305 is added to a memory size requested this time has reached a predetermined available upper limit value or not is discriminated. If NO, step S1303 follows. If YES, the processing routine is finished as an error status.

In step S1303, the memory size requested this time is added to the sum of the memory obtaining requests made so far via the OS 305 and a requested memory area is allocated. In step S1304, whether a memory release request has been made or not is discriminated. If YES, step S1305 follows. If NO, step S1306 follows. In step S1305, the memory size corresponding to the number of times of the release request this time is subtracted from the sum of the memory obtaining requests made so far via the OS 305 and the allocated memory area is released.

In step S1306, whether a sled forming request has been made or not is discriminated. If YES, step S1307 follows. If NO, step S1309 follows. In step S1307, whether the number in which the number of times of the sled forming process performed so far via the OS 305 and the present request are added has reached a predetermined available upper limit value or not is discriminated. If NO, step S1308 follows. If YES, the processing routine is finished as an error status.

In step S1308, the present request is added to the sum of the number of times of the sled forming process performed so far via the OS 305 and a sled is formed.

In step S1309, a sled release request has been made or not is discriminated. If YES, step S1310 follows. If NO, step S1311 follows. In step S1310, the number of sleds corresponding to the present release request is subtracted from the number of sleds formed so far via the OS 305 and the allocated sled is released. In step S1311, other process is executed. Although only a memory use amount and the number of formed sleds have been mentioned in the embodiment, the invention can be applied to a resource such as the number of sockets or the like which are used to communicate in the network processing unit 7.

Other embodiments of the invention will now be described with reference to FIGS. 6, 7, 8, 14, 15, and 16.

As shown in the application list 801 in FIG. 8, the number of applications which can be downloaded or activated in the first embodiment of the invention can be set to be larger than the number of mode keys 730, 731, and 732 shown in FIG. 7.

The second embodiment of the invention corresponds to such a situation as mentioned above.

Figure 14:
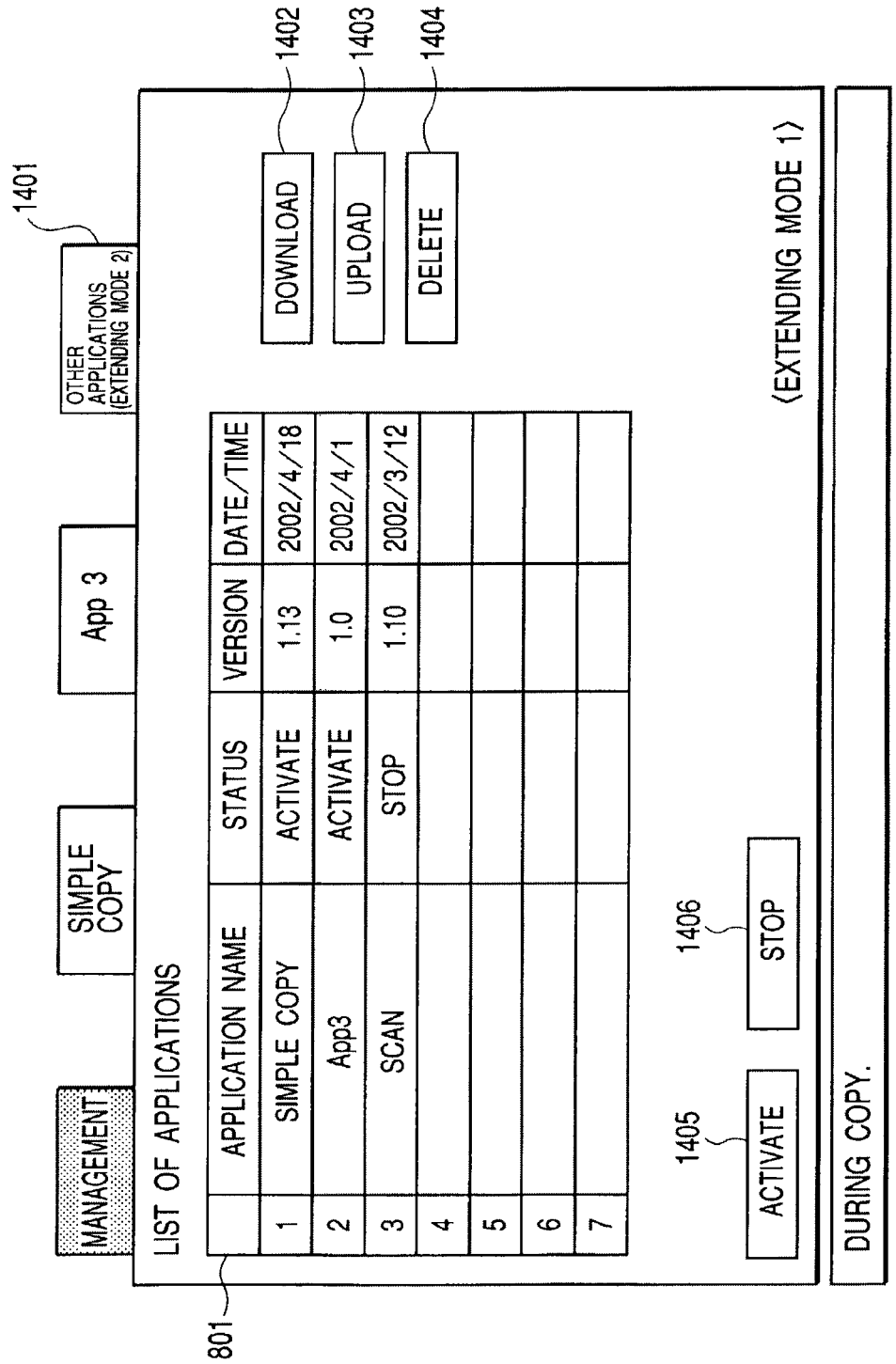
FIG. 14 is a diagram showing a display screen which is displayed just after a scan application was newly activated in FIG. 8.

FIG. 14 is a diagram showing a display screen which is displayed just after a scan application was newly activated in FIG. 8. An extending mode 2 key 1401 is a mode key as an example of the select keys of the invention. This key is pressed to shift the display screen to another display screen (FIG. 15) to select and execute the application which is executed on the second execution environment 305 of the invention. Although it is displayed in a manner similar to the case of selecting another mode key in the embodiment, such a display screen can be also displayed so as to be more easily and visually recognized by modifying a size or a design of the key or the like.

Figure 15:
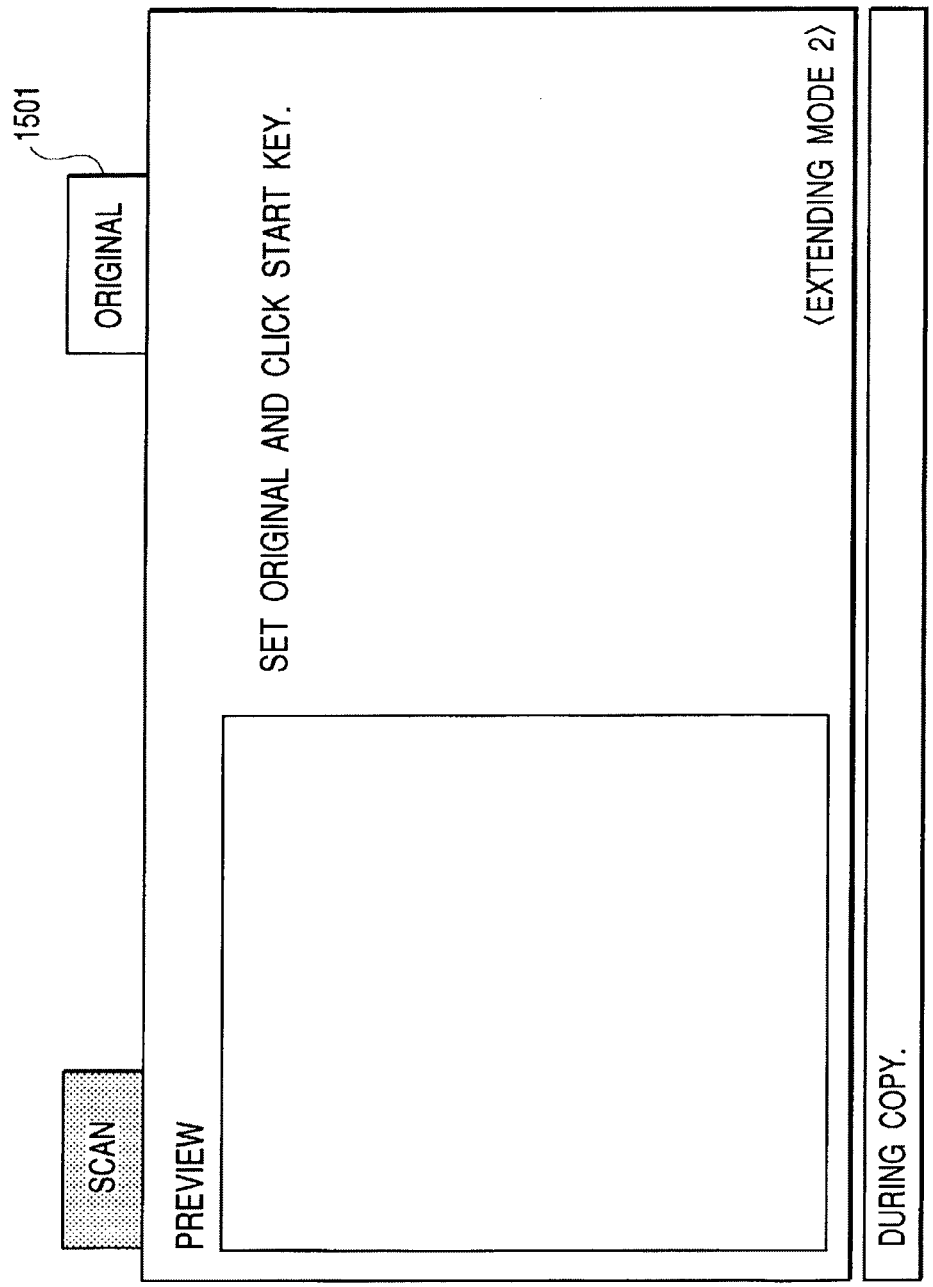
FIG. 15 is a diagram showing a display screen which is displayed when an extending mode 2 key 1401 is selected.

FIG. 15 is a diagram showing a display screen which is displayed when the extending mode 2 key 1401 is selected. An original mode key 1501 is a mode key as an example of the select keys of the invention. This key is pressed to shift the display screen to the display screen (FIG. 6) to select and execute the application which is executed on the real-time OS 301 as an example of the first execution environment of the invention. The function of this mode key is the same as that of the mode key 734 in the foregoing embodiment. Although it is displayed in a manner similar to the case of selecting another mode key in the embodiment, such a display screen can be also displayed so as to be more easily and visually recognized by modifying a size or a design of the key or the like.

When a scan application is stopped or deleted on the operation display screen of FIG. 14, the display screen is returned to the display screen of the mode keys of FIG. 8. That is, since only up to four select keys including a shift key are displayed on one display screen, if the scan application is added and activated in the state shown in FIG. 8, the operation display screen is as shown in FIG. 14 and the extending mode 2 key 1401 appears. By pressing the extending mode key, the display screen is shifted to the display screen of FIG. 15. If another program is further added in the state shown in FIG. 15, select keys further sequentially appear in an upper portion (on the right neighboring side of the scan key and on the left side of the original key) in FIG. 15 and a display screen (not shown) similar to that of FIG. 14 is displayed.

Figure 16:
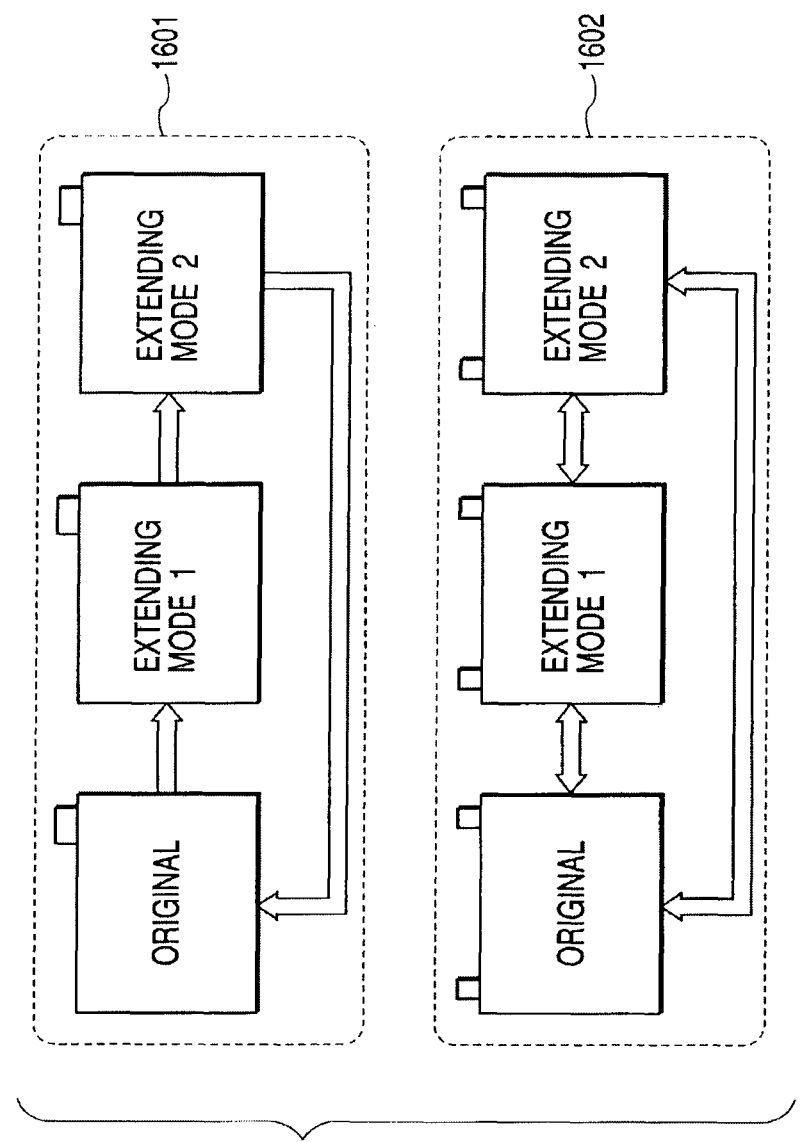
FIG. 16 is a diagram showing a shift sequence of the display screen which is displayed on the display unit of the image forming apparatus.

FIG. 16 is a diagram showing a shift sequence of the display screens which are displayed on the display unit of the image forming apparatus. Although the case of performing a shift 1601 has been shown in the second embodiment of the invention, a mode key which enables the mode to be shifted to the previous mode or the subsequent mode can be also provided for each display screen as shown at 1.602. If the number of operation display screens is dynamically increased with an increase in the number of applications which are activated, means for realizing such a shift is not particularly limited.

Although the embodiment has been mentioned only with respect to the case where the number of applications on the OS2 side is increased, naturally, even when the number of applications on the OS1 side is increased, the invention can similarly cope with such a case by providing the original mode key, original 2 mode key, and the like.

FIG. 19 is a diagram showing an example of processes which are executed after the activation of an application additional routine which is activated in response to the download of the application or the registration (input) of the application into the memory in the image forming apparatus. For example, such an additional routine is activated when the OK button is pressed in FIG. 8. It is now assumed that the scan program has newly been downloaded into the image forming apparatus. In step S1901, the resource management unit newly adds the program into the image forming apparatus and, further, discriminates whether a memory area enough to newly store a display screen is held in the image forming apparatus or not. If it is determined that the enough memory capacity does not exist, the processing routine advances to an error process in step S1910 and the processes are finished. If the resource management unit determines that there is enough memory capacity, step S1902 follows. In step S1902, a control application 9 (display control means) discriminates whether a function select key which is similar to each select key (820 to 823) shown in the upper portion of FIG. 8 and is used to select a new application can be added to the present display screen or not. The present display screen is a display screen which is being used at present or a display screen to newly add a select key which can instruct the selection or execution of a new program if the new program has been added. If it is determined in step S1902 that such a select key can be newly added to the present display screen, step S1903 follows. Subsequently, the display control application 9 registers display control information into the memory in the image forming apparatus so as to display a display screen in which the new function select key has been added to the present display screen and the processing routine is finished. Subsequently, if it is determined in step S1902 that the select key cannot be newly added to the present display screen, whether the new display screen (FIG. 15) which is displayed by switching the present display screen can be added or not is discriminated in step S1904. In FIG. 8, assuming that the apparatus has been set so that four or more select keys in total cannot be displayed, if the scan program is added in FIG. 8 by using the display screen of FIG. 9 or the like, the display control program registers it into the memory in the image forming apparatus so that it can be called while making the display screens of FIGS. 14 and 15 be associated with each other.

If it is determined in step S1904 that there is no ID which is made to correspond to the display screen or the memory area is full and a new display screen cannot be prepared, the error process is executed in step S1910. If it is determined in step S1904 that the new display screen which is displayed by switching the present display screen can be added, the control application 9 forms display control information of the new display screen and registers it into the memory in step S1905. In step S1906, the control application 9 mutually calls the present display screen in step S1902 and the new display screen and makes them correspond to each other so that they can be shifted. Further, step S1907 follows. In step S1907, the display control information (for example, the display control information which displays FIG. 14) into the memory so that the function select key (for example, the extending mode 2 key 1401) to call the new display screen is newly displayed to the present display screen in step S1902. Further, in step S1908, the display control information is registered into the memory so that the function select key to instruct the selection of a new application is displayed onto the new display screen added in step S1905. In step S1909, the present display screen in step S1902 is set to the added display screen to which no more function select key can be added and the new display screen added in step S1905 is updated and registered as a present display screen. The processing routine is finished.

It is also possible to construct the apparatus in a manner such that by a plurality of management applications implemented in the image forming apparatus, the program (the first application) on the real-time OS and the program (the second application) on the virtual machine execute a process such that each application module is downloaded from the outside of the image forming apparatus into the image forming apparatus or uploaded from the inside of the image forming apparatus to the outside of the image forming apparatus, or it is deleted or invalidated.

There is also a case where the management application deletes the application which can be executed on the virtual machine. For example, a display control program (discriminating means, display control means) displays the select key including a plurality of select keys to instruct the selection of a desired one of a plurality of programs stored in the copying apparatus onto the display unit of the operation unit of the copying apparatus. In response to the deletion of the program in the copying apparatus, whether the select key corresponding to the application to be deleted and the key corresponding to the application which subsequently remains in the image forming apparatus can be displayed as one display screen onto the display screen of the display unit or not is discriminated. For example, in the state of FIG. 14, when a delete button 1404 is pressed, the scan application is deleted. At the same time, it is prevented that the extending mode 2 button is displayed on the display screen in FIG. 14. That is, the display control program registers the display information which cannot call the display screen (the second display screen) in FIG. 15 from the display screen (the first display screen) in FIG. 14 into the memory.

In the API 303 and controller control unit 302 in FIG. 5, if the exclusive execution of the control command of the image forming apparatus is enabled, since the interfaces for controlling the image forming apparatus are called from both of the first and second execution environments via the API 303, the application module in any of the execution environments and the control module of the image forming apparatus can sequentially use the functions of the image forming apparatus. Thus, the image forming apparatus can be stably made operative.

Applications having equivalent ability can be developed and used in any of the execution environments. A part of the control programs in which importance is attached to the performance can be also developed and executed in the first execution environment. In this manner, the user can select either the first execution environment or the second execution environment in accordance with a request of specification such as transplant performance, response speed, or the like. Further, since it is sufficient to merely add the identifiers to the interfaces and the hybrid apparatus discriminates them and allows a proper apparatus to automatically execute the command, an affinity between the network environment and the communication environment can be realized.

By constructing the apparatus so that the application module can be downloaded, uploaded, deleted, or invalidated from/to an external interface of the image forming apparatus, the operability of the image forming apparatus can be improved.

Further, by constructing the apparatus in a manner such that when an application is added, a version or the like is compared and if conditions do not coincide, the application cannot be downloaded or the download fails, the reliability of the image forming apparatus can be improved.

Other Embodiments

The processes shown in FIGS. 12, 13, 18, 19, and the like in the embodiment are executed by each of the image forming apparatuses 100 and 200 in accordance with the programs which are installed from the outside. In such a case, the invention can be applied to a case where information group including the programs is supplied by a memory, medium such as CD-ROM, flash memory, FD, or the like, from an external memory medium via the network, or from an external computer.

Naturally, the objects of the invention are accomplished by a method whereby a memory medium in which program codes of software to realize the functions of the embodiments mentioned above have been recorded is supplied to a system or an apparatus or such program codes are downloaded from an external server (not shown) and a control unit (a CPU or an MPU) of the system or the apparatus reads out and executes the program codes stored in the memory medium.

In such a case, the program codes themselves read out from the memory medium realize the novel functions of the invention and the memory medium in which the program codes have been stored constructs the invention. As a memory medium for supplying the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only a case where the CPU executes the read-out program codes, so that the functions of the embodiments mentioned above are realized but also a case where an OS (Operating System) or the like which is operating on the image forming apparatus executes a part or all of actual processes on the basis of instructions of the program codes and the functions of the embodiments mentioned above are realized by those processes. Further, naturally, the invention incorporates a case where the program codes read out from the memory medium are written into a memory provided for a function expanding board inserted in the image forming apparatus or a function expanding unit connected to a computer and, thereafter, a CPU or the like provided for the function expanding board or the function expanding unit executes a part or all of actual processes on the basis of instructions of the program codes and the functions of the embodiments mentioned above are realized by those processes.

The invention is made in consideration of at least one of the foregoing problems. According to the invention, in the display unit of the image forming apparatus, the functions which are displayed can be flexibly changed in accordance with a change in program in the image forming apparatus so as to utilize the limited display unit.

According to another aspect of the invention, when a program is inputted into the image forming apparatus, the display screen to automatically select the application is added and displayed so that the existing display screen can be replaced with it.

According to further another aspect of the invention, when the programs in the image forming apparatus are deleted, the unnecessary display screens are automatically combined and the simple display screen which is easy for the user to use can be provided.

What is claimed is:

1. An application management apparatus in which a first application has been stored, comprising:
   a downloading unit configured to download at least one second application, different from the first application, from an external apparatus connected to the application management apparatus via a network; and
   a display unit configured to display a plurality of items, including: (a) the first application, (b) a tab for accepting an instruction for shifting a screen, (c) a list of downloaded second applications without displaying the first application after the tab is activated by a user, (d) a button for stopping one second application selected by the user from among the list of downloaded second applications, and (e) a button for deleting the selected one second application from the application management apparatus, wherein the display unit concurrently displays items (c)-(e) and a current status of the application management apparatus on a same panel of the application management apparatus.

2. The application management apparatus according to claim 1, wherein the display unit further displays version information of the downloaded second applications.

3. The application management apparatus according to claim 1, wherein the display unit displays items (b) to (e) using a character train indicating that the displayed items are related to application management.

4. A method carried out in an application management apparatus in which a first application has been stored, the method comprising the steps of:

downloading at least one second application, different from the first application, from an external apparatus connected to the application management apparatus via a network; and displaying a plurality of items, including: (a) the first application, (b) a tab for accepting an instruction for shifting a screen, (c) a list of downloaded second applications without displaying the first application after the tab is activated by a user, (d) a button for stopping one second application selected by the user from among the list of downloaded second applications, and (e) a button for deleting the selected one second application from the application management apparatus, wherein items (c)-(e) are concurrently displayed with a current status of the application management apparatus on a same panel of the application management apparatus.

5. The method according to claim 4, wherein version information of the downloaded second applications are displayed in the displaying step.

6. The method according to claim 4, wherein items (b) to (e) are displayed in the displaying step using a character train indicating that the displayed items are related to application management.

7. A non-transitory computer readable storage medium storing a program causing a method to be carried out in an application management apparatus in which a first application has been stored, the method comprising the steps of:

downloading at least one second application, different from the first application, from an external apparatus connected to the application management apparatus via a network; and displaying a plurality of items, including: (a) the first application, (b) a tab for accepting an instruction for shifting a screen, (c) a list of downloaded second applications without displaying the first application after the tab is activated by a user, (d) a button for stopping one second application selected by the user from among the list of downloaded second applications, and (e) a button for deleting the selected one second application from the application management apparatus, wherein items (c)-(e) are concurrently displayed with a current status of the application management apparatus on a same panel of the application management apparatus.

8. The non-transitory computer readable storage medium according to claim 7, wherein version information of the downloaded second applications are displayed in the displaying step.

9. The non-transitory computer readable storage medium according to claim 7, wherein items (b) to (e) are displayed in the displaying step using a character train indicating that the displayed items are related to application management.

* * * * *